(12) United States Patent
Richardson et al.

(10) Patent No.: US 10,592,869 B2
(45) Date of Patent: Mar. 17, 2020

(54) VISUALIZATION AND ANALYSIS OF SCHEDULING DATA

(71) Applicant: Helixaeon Inc., Boulder, CO (US)

(72) Inventors: Daniel Patrick Richardson, Boulder, CO (US); Reyna Suzanne Bryan, Golden, CO (US); Andrew Brandt, Boulder, CO (US)

(73) Assignee: Helixaeon, Inc., Boulder, CO (US)

( * ) Notice: Subject to any disclaimer, the term of this patent is extended or adjusted under 35 U.S.C. 154(b) by 0 days.

(21) Appl. No.: 16/194,199

(22) Filed: Nov. 16, 2018

(65) Prior Publication Data

US 2019/0087787 A1 Mar. 21, 2019

Related U.S. Application Data

(63) Continuation of application No. 14/684,078, filed on Apr. 10, 2015, now Pat. No. 10,185,933.

(60) Provisional application No. 61/978,974, filed on Apr. 13, 2014.

(51) Int. Cl.
| | |
|---|---|
| *G06T 15/00* | (2011.01) |
| *G06Q 10/10* | (2012.01) |
| *G06T 17/00* | (2006.01) |
| *G06T 19/20* | (2011.01) |

(52) U.S. Cl.
CPC ......... *G06Q 10/1095* (2013.01); *G06T 17/00* (2013.01); *G06T 19/20* (2013.01); *G06T 2219/2016* (2013.01)

(58) Field of Classification Search
CPC ....... G06T 11/206; G06T 19/00; G06T 19/20; G06T 17/00; G06T 2219/2016; G06Q 30/0201; G06Q 10/1095
USPC ........................................................ 345/418
See application file for complete search history.

(56) References Cited

U.S. PATENT DOCUMENTS

| | | | | |
|---|---|---|---|---|
| 7,590,553 | B2 * | 9/2009 | Coates | G06Q 10/047 705/7.26 |
| 8,843,824 | B1 * | 9/2014 | Daly, IV | G06F 3/04817 715/712 |
| 9,165,260 | B1 * | 10/2015 | Olmsted | G06Q 10/109 |
| 9,256,970 | B2 * | 2/2016 | Hao | G06Q 30/0201 |
| 10,185,933 | B2 * | 1/2019 | Richardson | G06F 16/26 |

OTHER PUBLICATIONS

Hartl, P.R., 2008. Visualization of Calendar Data. Diploma Thesis, Vienna University of Technology.*

(Continued)

*Primary Examiner* — Phu K Nguyen
(74) *Attorney, Agent, or Firm* — Duft & Bornsen, PC

(57) ABSTRACT

Methods and structure for presenting and analyzing schedule data. One exemplary embodiment is a system that includes an interface and a controller. The controller is able to identify a schedule comprising multiple events occurring over a length of time, to select a cyclic period within the length of time, and to generate a representation of the length of time as a view of a three dimensional (3D) helix wherein each revolution of the 3D helix corresponds with an iteration of the cyclic period. The controller is also able to determine an event location for each of the events along a path defined by the 3D helix, and to direct the interface to transmit instructions for presenting the 3D helix and the event locations via a display.

20 Claims, 14 Drawing Sheets

(56) References Cited

OTHER PUBLICATIONS

Tominski C, Schumann H. Enhanced interactive spiral display. InSIGRAD 2008. The Annual SIGRAD Conference Special Theme: Interaction; Nov. 27-28, 2008 Stockholm; Sweden Nov. 27, 2008 (No. 034, pp. 53-56). Linkoping University Electronic Press.*

Weber, M., Alexa, M. and Muller, W., Oct. 2001. Visualizing time-series on spirals. In Infovis (vol. 1, pp. 7-14).*

Hewagamage KP, Hirakawa M, Ichikawa T. Interactive visualization of spatiotemporal patterns using spirals on a geographical map. InVisual languages, 1999. Proceedings. 1999 IEEE symposium on 1999 (pp. 296-303). IEEE.*

* cited by examiner

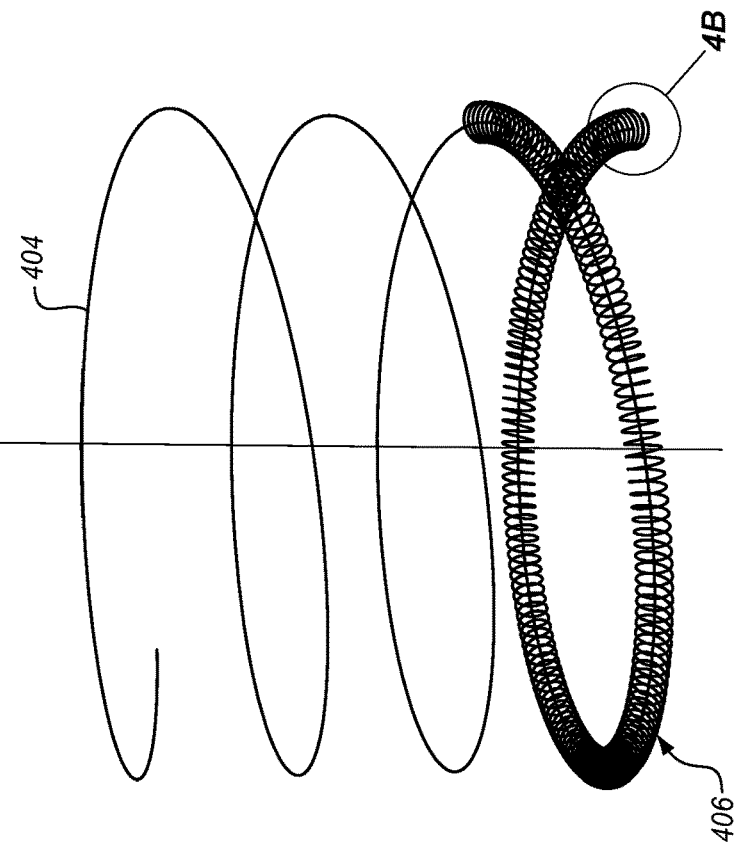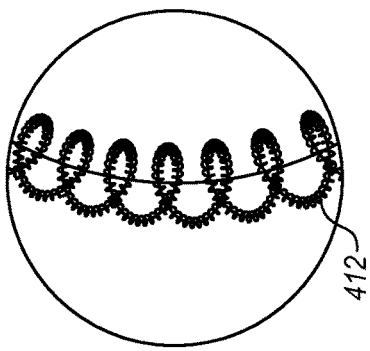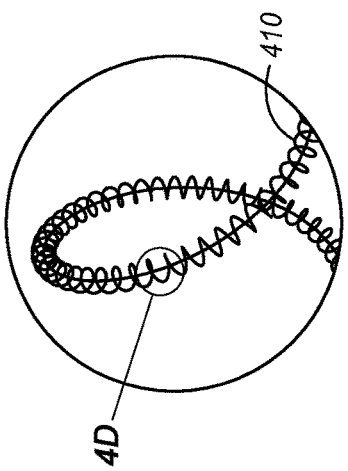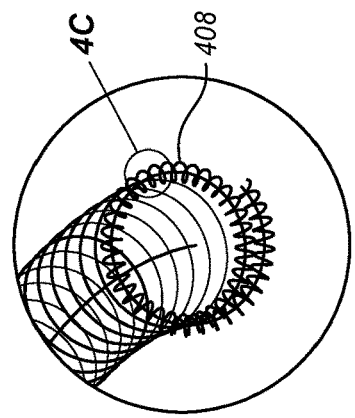

| TIMESTAMP | LOCATION | COORD (PARENT) | COORD (CHILD) | EVENT NAME | SOURCE | LAYER | TAGS |
|---|---|---|---|---|---|---|---|
| 2018:250:4:30:01 | 40.019, -111.280 | R1a, Z1a, θ1a | R1b, Z1b, θ1b | WAKE ALARM | CALENDAR | 1 | HOME |
| 2018:250:9:12:14 | 40.119, -105.391 | R2a, Z2a, θ2a | R2b, Z2b, θ2b | GYM ARRIVAL | GPS | 1 | FIT |
| 2018:251:6:15:27 | 40.347, -105.443 | R3a, Z3a, θ3a | R3b, Z3b, θ3b | HAPPY HOUR | SOCIAL NETWORK | 2 | ANDREW, REYNA |
| 2018:252:0:00:01 | 40.019, -111.280 | R4a, Z4a, θ4a | R4b, Z4b, θ4b | SLEEP | FIT BAND | 3 | HOME, FIT |

VISUALIZATION AND ANALYSIS OF SCHEDULING DATA

FIELD OF THE INVENTION

The invention relates generally to scheduling and analyzing schedules of activities.

BACKGROUND

Scheduling systems such as calendars are used for a variety of purposes in order to track how time is spent and to reserve time for future events. For example, a calendar is a system by which a user may transcribe a list of their future activities in order to ensure that those activities are not missed and do not conflict with other future activities. Users continue to desire advances in scheduling technology in order to enhance their lives.

SUMMARY

Systems and methods herein provide for creating and analyzing a schedule of events. For example, the embodiments discussed herein may represent a schedule of events along the path of a three dimensional (3D) helix presented to a user, and/or provide recommendations for changing future behavior based on the schedule of events.

One exemplary embodiment described herein is a system that includes an interface and a controller. The controller is able to identify a schedule comprising multiple events occurring over a length of time, to select a cyclic period within the length of time, and to generate a representation of the length of time as a view of a three dimensional (3D) helix wherein each revolution of the 3D helix corresponds with an iteration of the cyclic period. The controller is also able to determine an event location for each of the events along a path defined by the 3D helix, and to direct the interface to transmit instructions for presenting the 3D helix and the event locations via a display.

A further exemplary embodiment comprises a system that includes a recommendation controller and a memory. The recommendation controller is able to detect a schedule comprising multiple events occurring over a length of time, and to recursively: identify an event for rescheduling, identify a new time or location for the identified event based on criteria stored in the memory, determine whether the new time causes the event to conflict with an event that has a higher priority than the identified event, and reschedule the identified event to the new time or location if the new time or location does not cause the identified event to conflict with a higher priority event.

Other exemplary embodiments (e.g., methods and computer readable media relating to the foregoing embodiments) are also described below.

BRIEF DESCRIPTION OF THE FIGURES

Some embodiments of the present invention are now described, by way of example only, and with reference to the accompanying figures. The same reference number represents the same element or the same type of element on all figures.

FIGS. 4A-D are diagrams illustrating an exemplary nested helical representation of a schedule of events.

DETAILED DESCRIPTION OF THE FIGURES

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
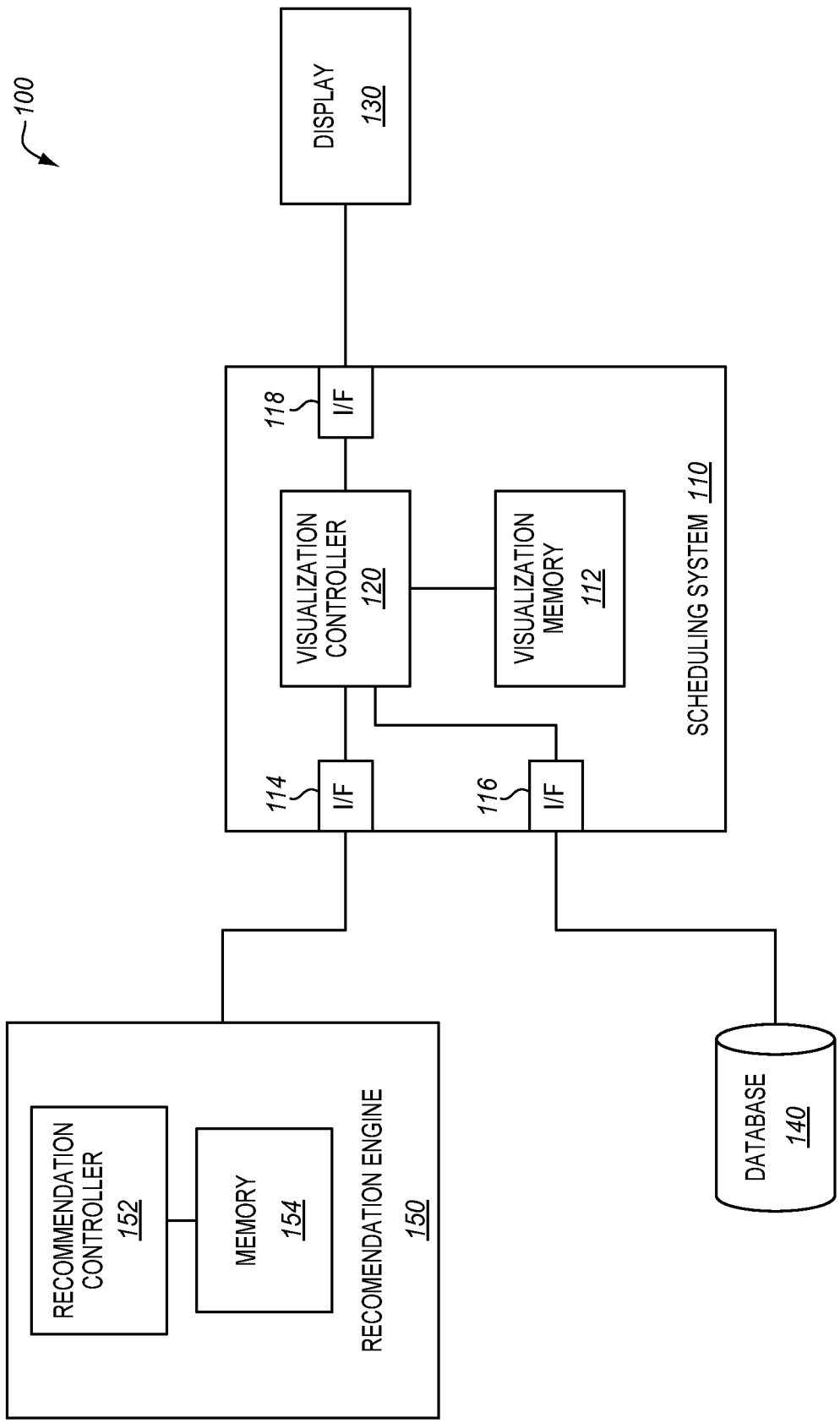
FIG. 1 is a block diagram of an exemplary scheduling system.

FIG. 1 is a block diagram 100 of an exemplary scheduling system 110. In this embodiment, scheduling system 110 is operable to access a database 140 storing a schedule of events, and to illustrate the schedule of events as a three dimensional (3D) helix via a display 130. The cyclic nature of the helix allows for a user to quickly identify cyclic/repetitive and/or time consuming patterns of behavior within the schedule, and/or other information about how she has been spending her time. This may also enable a user to engage in decision making processes to update or change their future schedule, based on the information provided by the helix.

As shown in FIG. 1, scheduling system 110 includes visualization controller 120, which manages the overall operations of scheduling system 110, and controls one or more interfaces (e.g., I/F 114, I/F 116, I/F 118) in order to control the operations of various coupled devices. Specifically, visualization controller 120 accesses scheduling information from database 140 (e.g., a remotely hosted database accessible via the Internet, or in one embodiment a local database stored in memory 112) in order to determine which events to present on the 3D helix, as well as where to place those events on the 3D helix.

Visualization controller 120 accesses visualization memory 112 in order to generate, update and/or modify views of the 3D helix. Visualization controller 120 may be implemented as custom circuitry, a processor executing programmed instructions stored in program memory, or some combination thereof. In one embodiment, visualization controller 120 may be automatically altered based on software updates provided via a backend interface of a central server via the Internet. This ensures that updates can be pushed to multiple scheduling systems (e.g., millions of apps) without extensive investments of developer or user time.

Interfaces 114, 116, and 118 may comprise any suitable communication channels for exchanging data, such as a computer bus, a Peripheral Component Interconnect Express (PCIE) interface, an Ethernet interface, an Institute of Electrical and Electronics Engineers (IEEE) 802.11 compliant wireless interface, etc. Visualization memory 112 may comprise any suitable memory component for storing digital data, such as a Random Access Memory (RAM) or a flash memory Solid State Drive (SSD) for quickly storing and retrieving pixel data for presentation on display 130. Display 130 presents schedules of events as 3D helical structures, based on input from scheduling system 110. Display 130 may comprise a high resolution flat panel monitor, a smart phone or tablet screen, etc.

FIG. 1 further depicts recommendation engine 150, which includes a recommendation controller 152 as well as a memory 154. Recommendation controller 152 reviews events in database 140 (e.g., events that have yet to occur, have already occurred, or are presently occurring), analyzes the events based on criteria in analysis memory 154, and makes recommendations to change patterns of behavior based on its analysis. Recommendation controller 152 may be implemented as custom circuitry, a processor executing programmed instructions stored in program memory, or some combination thereof. In one embodiment, scheduling system 110 and recommendation engine 150 may be implemented on the same components of a mobile device. The particular arrangement, number, and configuration of components described herein is exemplary and non-limiting. In one embodiment, all of the elements shown in FIG. 1 are implemented by componentry on a cellular phone or tablet computer performing instructions provided by an "app" stored in program memory.

Further details of the operation of scheduling system 110 will be described with respect to method 200 of FIG. 2. Assume, for this embodiment, that a user has recently listed a series of events to perform via a calendaring application. Further, assume that visualization controller 120 has accessed one or more information sources in the form of Global Positioning System (GPS) coordinates determined from satellite input, phone logs determined from a call history stored in memory, pedometry and/or heart rate information from a fitness band, social networking posts accessed via a social network Application Programming Interface (API), etc. For example, controller 120 may contact a social network server with an instruction directing the server to provide a schedule. Events from all of these sources may be pulled by visualization controller 120 via any suitable electronic interface, or may be pushed to visualization controller 120 from outside sources through an API (e.g., via an intermediary Internet server for scheduling system 110, or directly). Any combination of these events may be stored in database 140 and referred to as a schedule.

Figure 2:
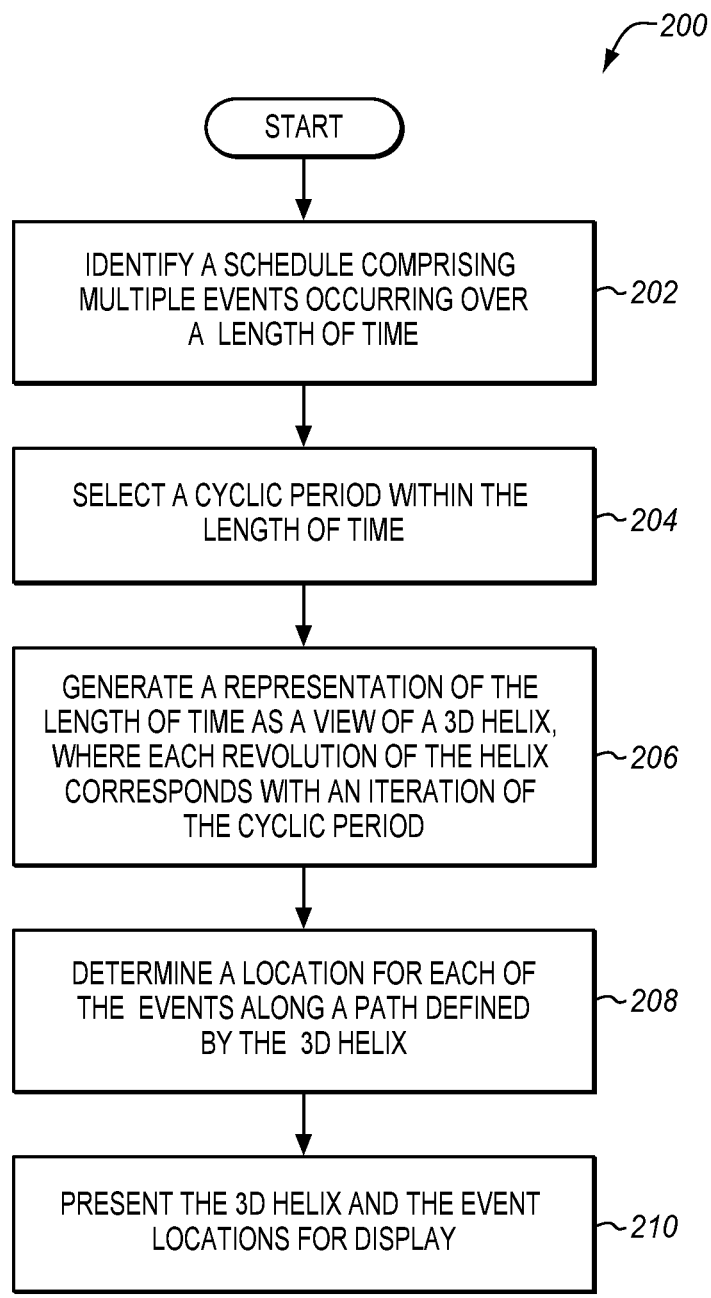
FIG. 2 is a flowchart describing an exemplary method to operate a scheduling system.

FIG. 2 is a flowchart describing an exemplary method 200 to operate a scheduling system. According to FIG. 2, in step 202 visualization controller 120 identifies a schedule comprising multiple events occurring over a length of time. As used herein, an event is any activity attended by a person, related to a person, or related to an object (e.g., an asset or equipment), such as playing golf, waking up, taking a step, transferring money between a user's bank accounts, attending a meeting, etc. In one embodiment, visualization controller 120 identifies the schedule as a set of events maintained in database 140, such as the entire set of events in database 140, or a filtered portion thereof (e.g., based on type of event, a length of time, a user, etc.). In a further embodiment, visualization controller 120 identifies the schedule by dynamically assembling the schedule from an acquired stream of events that are being reported in real time from multiple sources. The events of such a dynamically generated schedule may be stored in database 140 for later review.

In step 204, visualization controller 120 selects a cyclic period within the length of time occupied by the schedule. As used herein, a cyclic period refers to a repeating standard unit of time, such as a millisecond, second, minute, hour, day, week, month, quarter, year, decade, etc. Visualization controller 120 may select the cyclic period based on a chosen scale for representing the helix to the user. For example, the selection of the cyclic period may be made based on user input indicating a preferred zoom/magnification/detail level/timescale, by identifying the largest cyclic period that exists within the length of time covered by the schedule, or by any suitable technique.

Step 206 comprises controller 120 generating a representation of the length of time as a view of a 3D helix. As referred to herein, a 3D helix is a helical shape that occupies three dimensions, and a view of a 3D helix is a 2D representation of a 3D helix taken from a selected viewpoint in a 3D space, and capable of being shown on a display. Visualization controller 120 generates the view of the 3D helix such that each revolution/rotation of the helix corresponds with an iteration of the selected cyclic period. In one embodiment, this process involves generating equations for representing the 3D helix as a group of picture elements (pixels) and/or volume elements (voxels) on a screen. The equations governing the helix shape may be based on trigonometric functions along horizontal axes (e.g., $x=\sin(2\pi*t)$ radians, and $y=\cos(2\pi*t)$ radians, wherein each unit oft corresponds with the cyclic period of time), and a linear function along a vertical, central axis of the helix (e.g., $z=t$). The equations may be defined in an absolute coordinate system (e.g., Cartesian, cylindrical, polar, etc.) or relative coordinate system as desired. As used herein, a "path" of the helix refers to the locations in space occupied by the helix as defined by its governing equations.

In a further embodiment, the visualization controller identifies multiple cyclic periods that each have a different duration within the length of time of the schedule. The visualization controller then represents the 3D helix as a nested helical structure wherein a parent helix is defined according to a coordinate system and set of equations as described above, and a child helix utilizes the path defined by the parent helix as a central axis from which a radius of the child helix extends. This means that locations on the child helix may be defined with respect to the path of the parent helix via a relative coordinate system (e.g., in the example discussed above, a z axis of the child helix may be defined with respect to the path of the parent helix). The child helix may alternatively be defined in an absolute coordinate space as desired. In a further embodiment, multiple child helices may be nested inside of each other, in order to generate a helical structure that exhibits a substantially fractal geometry. Thus, each revolution of a child helix may correspond to a cyclic period that is shorter than the cyclic period of the parent helix.

For example, a parent helix with a revolution period of one day may nest a child helix with a revolution period of one hour. In this manner, twenty four revolutions of the child helix correspond with one revolution of the parent helix, and twenty four revolutions of the child helix are found within a single revolution of the parent helix. Furthermore, the ratio of child helix radius to parent helix radius may correspond with the ratio of child helix cyclic period (per revolution) to parent helix cyclic period (per revolution). Other aspects of the child helix (e.g., pitch, radius, etc.) may be dynamically adjusted when properties of the parent helix are adjusted, to ensure that the radius of the child helix with respect to the parent helix (or the number of revolutions of the child helix per revolution of the parent helix) is preserved.

In one embodiment, controller 120 generates a view of a simplified version of the helical structure for presentation at display 130. For example, if the helical structure includes multiple levels of nested helices, controller 120 may render the helix as having no nested helices, as having only a parent and a child helix, as having only three nested helices, etc. Controller 120 may dynamically adjust the number of helices shown/rendered (as well as which helices are shown), for example, based on a level of zoom or detail requested by a user, or based on a length of time selected for reviewing by the user. This ensures that the user is not overwhelmed by complex geometry (e.g., one hundred nested helices shown all at once), but is still dynamically presented with relevant information. This also reduces overall processing load and ensures that the presented content more digestible to the user.

Figure 3:
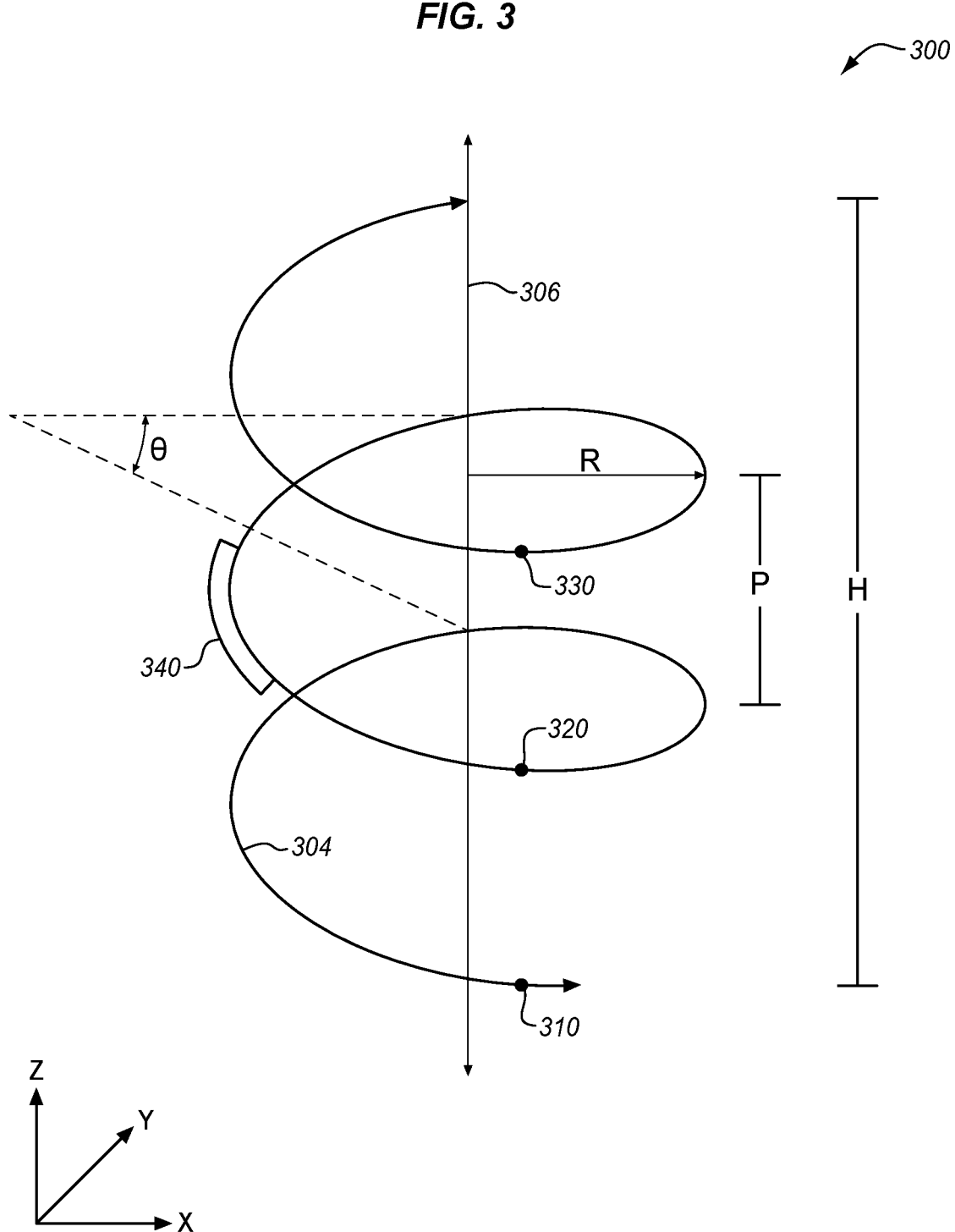
FIG. 3 is a diagram illustrating an exemplary helical representation of a schedule of events.
Figures 6, 7:
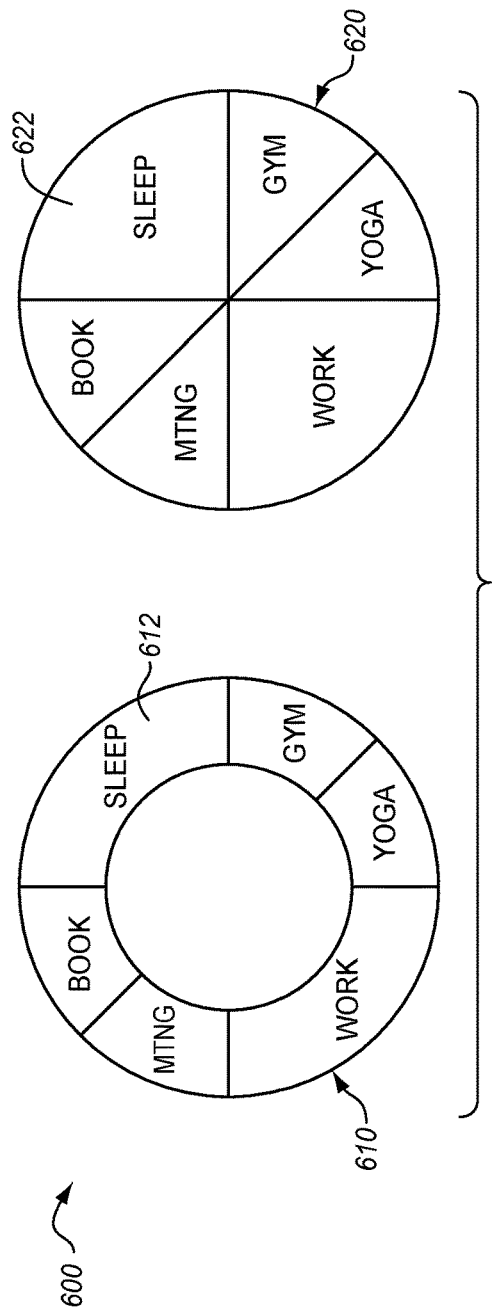
FIG. 6 is a diagram illustrating exemplary cross-sectional views of one revolution of a helical representation of a schedule of events.
FIG. 7 is a table illustrating exemplary data stored for a schedule of events.

In one embodiment, each parent/child helix is associated with multiple fixed zoom levels. The first zoom level illustrates the helix from the side (as shown in FIG. 3), and presents a "stack" of several revolutions of the helix. For example, the zoom level may provide a traversable sliding window of three revolutions of the helix. The second zoom level illustrates a single revolution of the helix in detail. In the second zoom level, the helix is illustrated from a viewpoint that is perpendicular to the central axis of the helix. Thus, instead of appearing as a "stack" of multiple revolutions, a single-revolution cross-section of the helix is shown "head on" (e.g., as shown in FIG. 6) as a circle or split-washer. In the third zoom level, a portion of a single revolution is shown. This may correspond with a stacked view of a child helix, which may itself be associated with multiple zoom levels as described herein, and so on for further child helices. Thus, controller 120 may identify user input adjusting a level of magnification of the helix, and alter an angle of the view to present either a revolution of the parent 3D helix or a revolution of the child 3D helix, based on the level of magnification.

In step 208, controller 120 determines a location for each of the events along a path defined by the 3D helix. This may comprise mapping each of the events to a 3D coordinate (e.g., (x,y,z), (r,θ,z), etc.) by applying a location in time that the event occurred to the equations defining the 3D helix. In embodiments where the 3D helix comprises a nested helical structure comprising parent helices and child helices, controller 120 may identify the child helix with the smallest radius (e.g., the smallest child helix) that is currently being displayed/rendered, and may determine the event's location on that helix based on the equations for defining that helix. In a further embodiment, events of a duration shorter than a threshold length of time are suppressed from viewing, and the threshold length of time changes depending on the level of zoom/detail at which the 3D helix is viewed.

Some events may be represented as instantaneous points along the 3D helix, while other events may occupy contiguous periods of time as indicated by a path segment of the 3D helix. In one embodiment, controller 120 identifies recurring events (or events of a similar type) that are reported on a recurring basis (e.g., once per minute, once per day, etc.), and infers that individual, proximate reports indicate a continuous and ongoing overarching activity. For example, a series of individual timestamped step reports from a pedometer may accumulate to identify as a single overarching event (a jog), while a break or reduction in such events for a threshold period of time (e.g., one full minute) may indicate that the overarching event has completed. Such overarching activities may be represented as a single path segment of the 3D helix, even though they are reported as a series of instantaneous or short events.

In a further embodiment, reported events include a start time and an end time. Thus, when identifying locations for events on the 3D helix, controller 120 may identify a single coordinate on the helix that an event corresponds with, or may determining a length of a segment of the helix occupied by the event when the event covers a duration of time. In step 210, controller 120 operates I/F 118 to direct display 130 to present the 3D helix and the event locations for viewing at display 130. This may comprise transmitting instructions for displaying pixels via a screen, projector, or other display device. The instructions may comprise vector instructions for drawing various components of the 3D helix, bitmap information, voxels that define the 3D helix, etc.

Method 200 provides a benefit over prior systems, because it revolutionizes visualization of cyclic scheduling data patterns. For example, visualization controller 120 may present the 3D helix as a full 3D model capable of being panned, rotated, and zoomed as desired by a user, and even presented in an exploded axonometric, extruded, or expanded form. Visualization controller 120 may even alter selected portions of the 3D helix by presenting those selected portion in an exploded view, wherein each event or category of events in the selected portion exhibits a different radius from a central axis of the 3D helix. Method 200 enables the user to acquire a holistic understanding of how their time is used, as well as a granular understanding of the individual events that make up their schedule. At the same time, the cyclic nature of the 3D helix presented the user provides an intuitive insight into how events (and/or categories of events) cyclically repeat over time.

Even though the steps of method 200 are described with reference to scheduling system 110 of FIG. 1, method 200 can be performed in other calendaring and/or visualization systems as desired. The steps of the flowcharts described herein are not all inclusive and can include other steps not shown. The steps described herein can also be performed in an alternative order.

FIG. 3 is a diagram 300 illustrating an exemplary helical representation (i.e., 3D helix 304) of a schedule of events. 3D helix 304 defines a helical path with respect to a central axis 306, which may be an absolute axis in a coordinate space, or a relative axis along the path of a parent helix. As shown in FIG. 3, various aspects of helix 304 may be quantified, such as a pitch angle θ, indicating an angle between corresponding radial locations on neighboring revolutions, a radius R, a pitch height P indicating a distance along the central axis between corresponding radial locations on neighboring revolutions of the helix, a height H of the helix along central axis 306, and an overall path length L.

Helix 304 also includes multiple events, including events represented by a single point, and events represented by a line/path length of helix 304. In this embodiment, helix 304 includes events 310, 320, and 330, which are periodically recurring events that occur at a point in time (e.g., waking up), and helix 304 also includes event 340, which occupies a length of time along helix 304 as shown by a continuous protrusion off of the path of helix 304.

FIGS. 4A-D illustrate a detailed view of a more complex helix than that represented in FIG. 3. Specifically, FIGS. 4A-D are diagrams illustrating an exemplary nested helical representation of a schedule of events. FIG. 4A shows a helix 404 located in an absolute coordinate space, wherein each revolution of helix 404 corresponds with a year. A top portion of helix 404 illustrates the path of helix 404 without showing any of the child helices nested inside of it, for the sake of enhancing clarity. Meanwhile, a bottom portion of helix 404 illustrates a helix 406 which utilizes the path of helix 404 as a central axis. Therefore, helix 404 operates as a parent of helix 406, which is a child of helix 404.

In this embodiment, each revolution of child helix 406 corresponds with a single day, so three hundred and sixty five revolutions of the child helix 406 occur in one revolution of the parent helix 404. This parent/child relationship continues when the view is zoomed in, as shown by FIG. 4B, where helix 408 which utilizes helix 406 as its parent helix. Each revolution of helix 408 corresponds with an hour. The relationship continues in FIG. 4C as helix 410 utilizes helix 408 as its parent helix. Each revolution of helix 410 corresponds with a minute. Furthermore, in FIG. 4D, Helix 412 utilizes helix 410 as its parent helix. Each revolution of helix 412 corresponds with a second.

Figure 5:
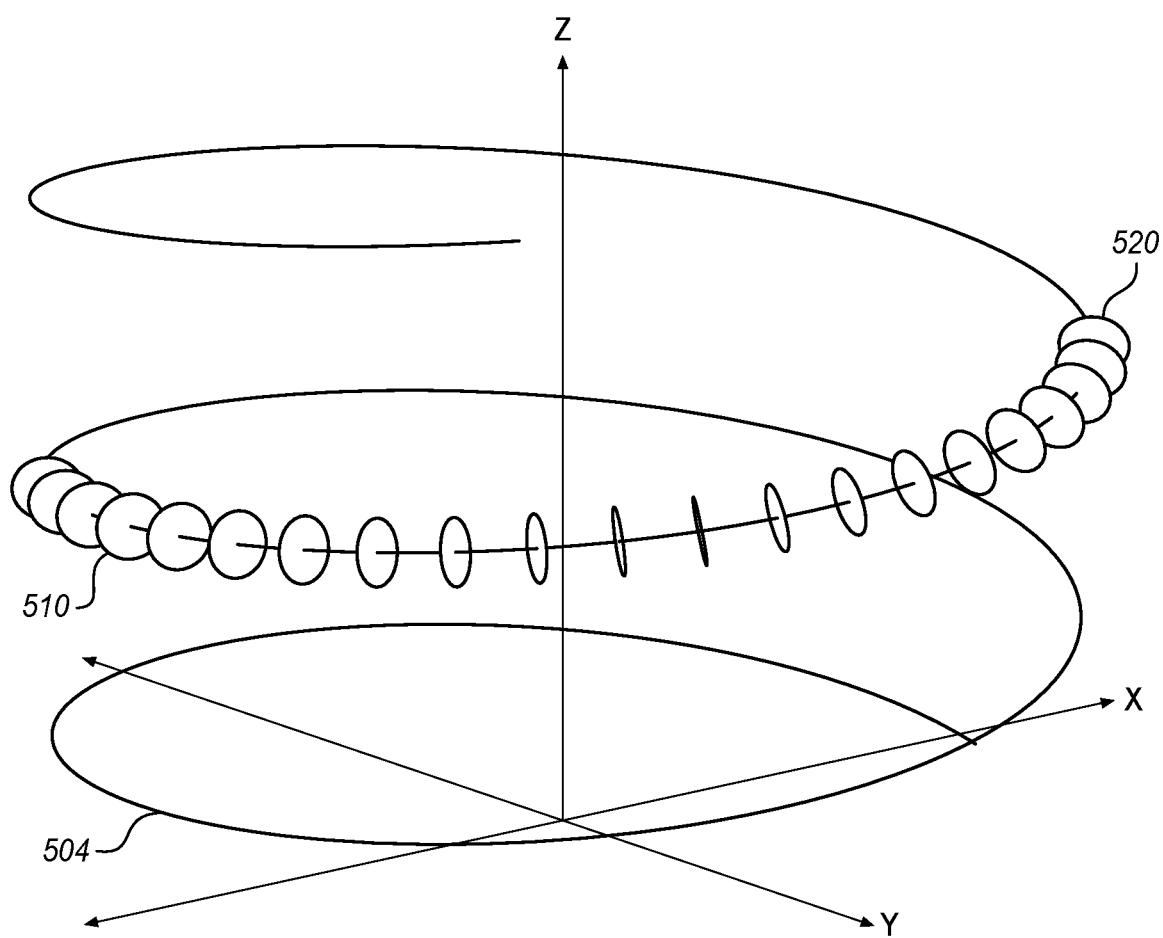
FIG. 5 is a diagram illustrating an exemplary helical arrangement of planar images.

FIG. 5 is a diagram illustrating an exemplary helical arrangement of planar images. Specifically, FIG. 5 illustrates an embodiment where controller 120 depicts the 3D helix as a discretized helical pattern comprising a series of planar images following a helical path. In FIG. 5, only a portion of the planar images are shown for the sake of clarity. In this embodiment the planar images (e.g., 510, 520) are placed along the path defined by 3D helix 504, and each comprise a substantially circular cross-section of helical path 504. Furthermore, the planar images each have a center/centroid or edge location that touches the path of helix 504, and each of the planar images is normal (or substantially normal) to the path of helix 504 and/or the XY plane. Where one revolution of helix 504 may correspond with one cyclic period of time, a planar image along helix 504 may correspond with a shorter cyclic period of time. Thus, if one revolution of helix 504 corresponds with a month, one planar image may correspond with a day.

FIG. 6 is a diagram 600 illustrating exemplary cross-sectional views of one revolution of a helical representation of a schedule of events. These cross-sectional views may correspond with the planar images of FIG. 5 described above. FIG. 6 illustrates two different versions of cross-sectional views, including a ring/doughnut view 610, and a pie chart view 620. Ring view 610 and pie chart view 620 each represent the same activities performed over time (e.g., sleep as shown at 612, 622).

FIG. 7 is a table 700 illustrating exemplary data stored for a schedule of events. Table 700 defines a schedule of events, based on information pulled from various sources, as well as information pushed to database 140 via an outside source contacting visualization controller 120 or recommendation controller 152 (e.g., via an API). As shown in FIG. 7, information stored in table 700 may include a timestamp, a location of the user when the event occurred (e.g., as indicated by GPS information), one or more coordinates defining a location of the event along a 3D helix (in this case, multiple sets of coordinates that each indicate a position on a parent or child helix), and one or more descriptors (e.g., event name, source, a layer number for the event, one or more tags indicating people who are involved, locations that are visited, categories for the event, etc.). The descriptors may be used to associated similar events, categorize types of events, and assign events to layers as desired. The descriptors may further be used as inputs for recommendation engine 150, as described below in the examples section.

Figure 8:
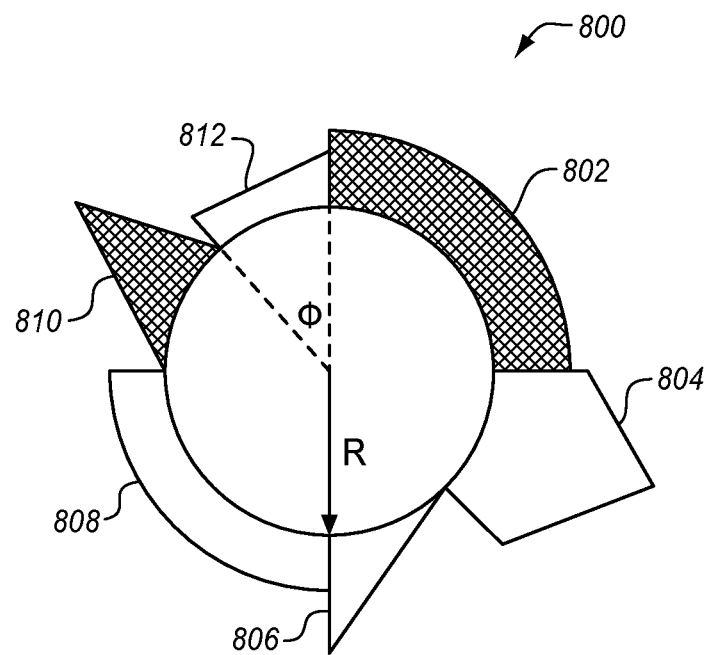
FIG. 8 is a diagram illustrating an exemplary set of layers for a schedule of events.
Figure 9:
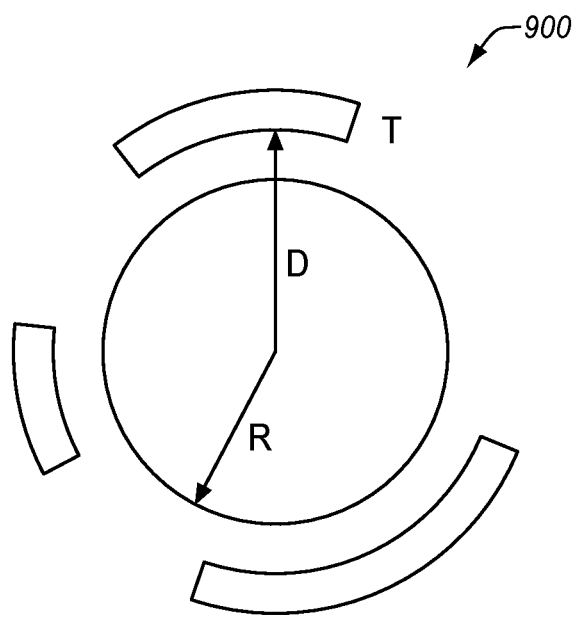
FIG. 9 is a diagram illustrating a further exemplary set of layers for a schedule of events.

FIG. 8 is a diagram 800 illustrating an exemplary set of layers for a schedule of events. As shown in FIG. 8, each event occupies a radial portion of one revolution of a helix, as indicated by the angle Φ. The length of each of the events in time corresponds with the size of Φ for that event. Furthermore, the events are presented at some radius R corresponding with a radius of the 3D helix, and the events are given a radial location within the revolution based on their start times. In FIG. 8, each event is categorized into a layer (e.g., a layer for active living/fitness, a layer for work, a layer for leisure activities), and events for each layer exhibit a different shape, style, size, color, etc. Thus, events 810, 812, 804, and 806 represent different layers (because they are different types of shapes, such as right triangles versus isosceles triangles), while events 802 and 808 represent events in the same layer. FIG. 9 is a diagram 900 illustrating a further exemplary set of layers for a schedule of events. In this embodiment, each layer is associated with a unique combination of thickness T and radial distance D from the central axis of the 3D helix. Thus, while the helix itself may be defined with a radius R, individual layers may deviate from this radius R in order to distinguish themselves from each other. In this manner, a visualization controller may correlate each scheduled event with a category, assign events correlated with different categories to different layers, and represent events for each layer on the helix with a different opacity, color, thickness, size, or shape. In one embodiment, each layer may be presented in this manner as part of an exploded axonometric or extruded view to the user In a further embodiment, selecting an event, a set of events, or a layer may cause a visualization controller to highlight in one of size, shape, color, radial distance, thickness, opacity, or other parameters. In one embodiment, events are assigned to categories (e.g., fitness, diet, work, etc.), and each of the categories is assigned to a different layer. The layers may be turned on or off (or may be otherwise manipulated) by updating a table stored in visualization memory and/or a database.

In a further embodiment, each layer represents a person that an event is associated with, a category for the event (e.g., fitness, work, networking, social, leisure, sport), a priority level for the event ranking an importance of the event with respect to other events, a thing, task, or concept associated with the event, etc. Still further, in one embodiment a visualization controller loads multiple schedules (e.g., from a centralized Internet server, by contacting a variety of other scheduling systems, or by identifying a set of users of a scheduling system) that each correspond with a different user. In such an embodiment, activities for each user may be represented by a different layer on the same helix (representing, for example, an entire project), or by different helices placed proximate to each other. The visualization controller may then allow individual users (as identified by a set of unique credentials such as a login and password) to modify their own layer of events, or to modify a combined schedule of events for all users. This may include flagging certain events, attaching questions or comments to certain events, assigning events to different users, and more. In this manner, users may collaborate with each other to facilitate the completion of various projects as desired. A recommendation engine may further regularly generate analytics and reports for a helix, including a multi-user helix, in order to indicate the categories of common events, the amount that a schedule of events has changed from its original version, and other statistics. Still further, this information may be used by recommendation controller 152 to identify shared periods of free time and/or low priority events for multiple users, and to recommend meeting times and/or locations based on those shared periods.

Figure 10:
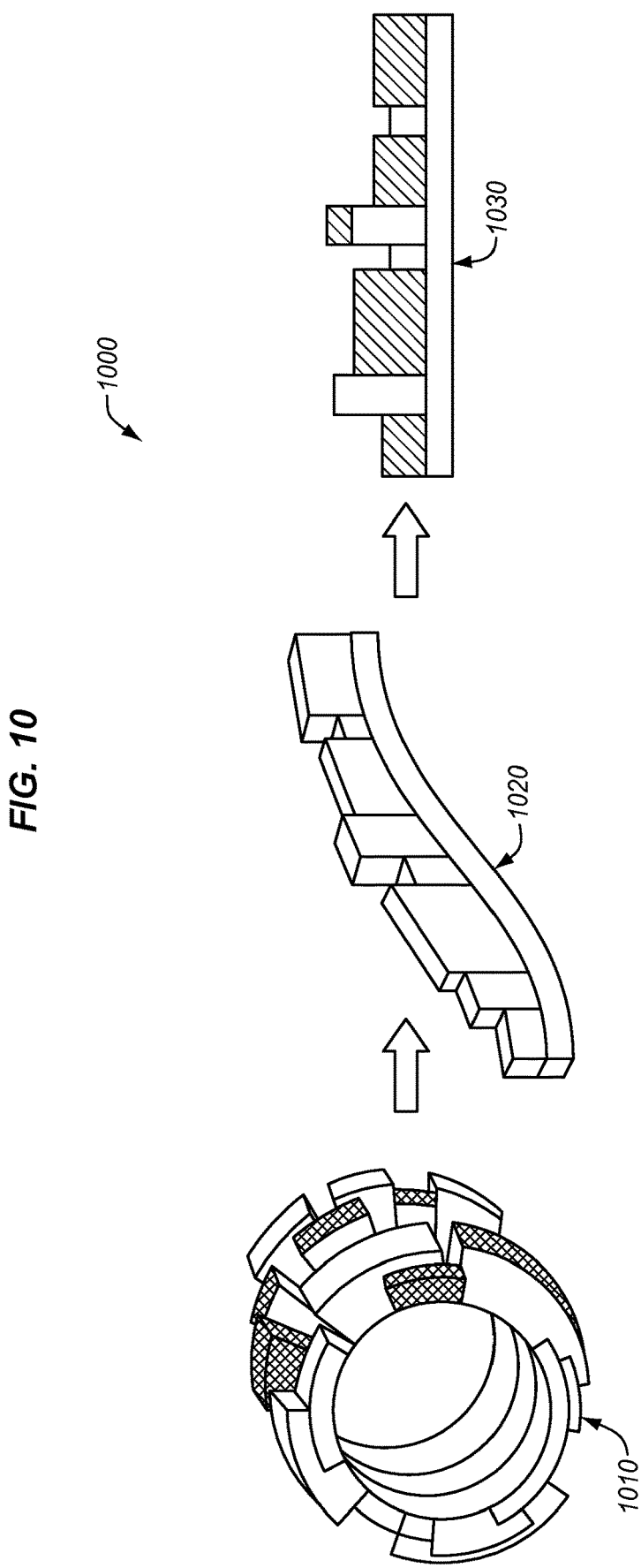
FIG. 10 is a diagram illustrating an exemplary linearized length of a helix representing a schedule of events.

FIG. 10 is a diagram 1000 illustrating an exemplary linearized length of a helix representing a schedule of events. According to FIG. 10, a user may direct a visualization controller to select a portion of a 3D helix as shown in 1010, and the visualization controller may unfurl the helix to linearize the chain of events onto a timeline, as shown in 1020 and 1030. A visualization controller may perform this operation by identifying a selected length of the helix in time, and arranging the events occurring over the length of time onto a linear timeline for viewing. In a further embodiment, the visualization controller may re-arrange events shown on the unfurled helix, by grouping events from similar layers/categories together on the timeline for viewing. This allows the user to quickly review and compare categories of events to visually determine the cumulative amount of time spent performing various activities during the selected length of time. Other representations may be shown with this information, such as pie charts, bar charts, and other suitable visualizations.

Figure 11:
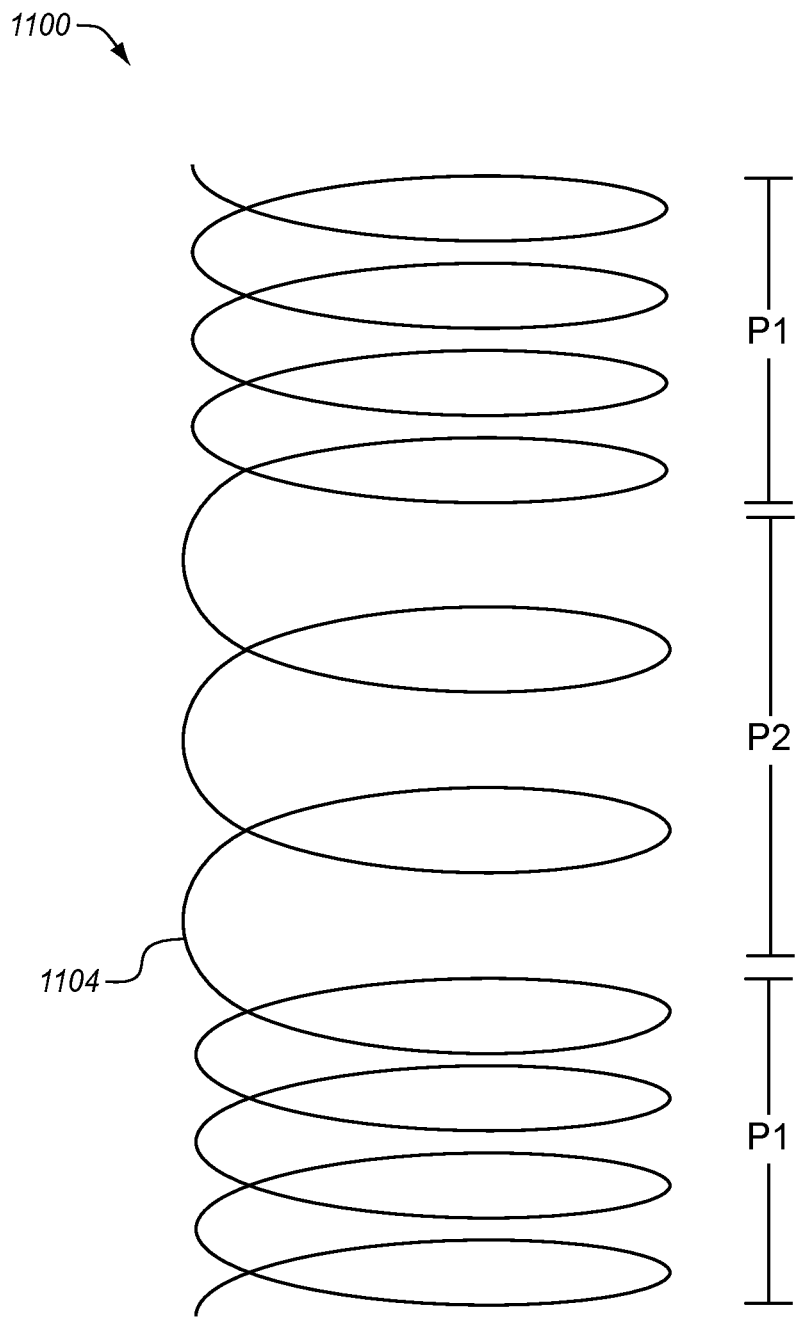
FIG. 11 is a diagram illustrating an exemplary helical representation of a schedule of events exhibiting a variable pitch.

FIG. 11 is a diagram 1100 illustrating an exemplary helical representation of a schedule of events exhibiting a variable pitch. In this embodiment, 3D helix 1104 exhibits a default pitch angle P1. However, a portion of 3D helix 1104 is shown with a changed pitch angle P2, allowing for easier analysis of that portion of 3D helix 1104. For example, pitch angle P2 may be substantially higher than pitch angle P1, and the portion of helix 1104 shown with pitch angle P2 may correspond with a region of 3D helix 1104 (or a length of time) selected by the user. The pitch angle P2 may be dynamically based on user input, zoom level, or the length of time covered in a user's selection of a region of the helix. In further embodiments where 3D helix 1104 comprises a nested helical structure, the altered pitch may apply to just the parent helix, just a child helix, or some combination thereof.

EXAMPLES

In the following examples, additional processes, systems, and methods are described in the context of a helical time mapping system. According to this example, a processor and memory on a user's smart phone implement a visualization controller and visualization memory. The visualization controller periodically queries an API of a social network, a calendar of the user associated with the user's email account, and GPS location services provided by the phone in order to generate a timeline of sufficient density and depth to enable the user to accurately and holistically evaluate their patterns of behavior. This event information is stored in a database in memory on the phone. In this example, when the user opens an app on the phone, the visualization controller identifies a default zoom level for viewing a 3D helix, which corresponds to a nested helical structure where a parent helix has revolutions that each correspond to one day, and a child helix has revolutions that each correspond to one hour. The path of the parent helix is defined in an absolute Cartesian coordinate space by the equations $x=\sin(2\pi*t)$ radians, $y=\cos(2\pi*t)$, radians and $z=t$, where t is measured in days. Meanwhile, the path of the child helix is defined (in a relative Cartesian coordinate space following the path of the parent helix), by the equations $x'=\sin(48\pi t)$ radians, divided by 24, $y'=\cos(48\pi t)$, divided by 24, and $z'=t/24$, where t is measured in days.

The visualization controller then begins to map individual events stored in the database to locations on the 3D helix. The visualization controller starts by identifying a timestamp for the first event in the database in time (or user selected portion thereof), and setting that timestamp value to $t=0$. The visualization controller then identifies a timestamp for the next event in time in the database, and identifies the difference in time between the identified event and the first event, in days. This difference in time corresponds with a value $t_1$, which is applied to the equations above to identify a location $(x_1, y_1, z_1)$ along on the parent helix in the absolute coordinate space. The visualization controller then defines a relative coordinate space with axes X', Y', and Z', where Z' follows the path of the parent helix, and X' and Y' are axes that are perpendicular to each other and to Z'. The visualization controller then applies the equations for the child helix to identify a location $(x_2', y_2', z_2')$ for the event along the child helix. This relative coordinate is then converted to a fixed location in the absolute coordinate space $(x_2, y_2, z_2)$. The visualization controller performs this task for each of multiple events in the database, and additionally calculates a 3D path of the parent helix and the child helix. Similar operations may be performed for further child helices with respect to their parents. Once a 3D model has been generated, the visualization controller generates views of the 3D model via a Graphical User Interface (GUI) as desired by panning, zooming, tilting, rotating, etc.

Events displayed via the GUI may be clickable targets, such that a user may select an event and be presented with a detailed description of the event. For example, clicking on an event may cause the visualization controller to present a name for the event, an exact time of the event, notes about the event, all tags/categories associated with the event, and other contextual information as desired. If the event is a social networking event, then a picture associated with the event (as stored in the database) may also be presented to the user. The details for an individual event may also be moved within the GUI, such that multiple events may be selected, and their details compared. A user may also drag-select a portion of the 3D helix for viewing, and the visualization controller may then generate a new view illustrating that portion of the helix.

In a further example, the mathematical equations governing a nested helical structure may be generated by a process which takes any differentiable parametric set of equations and wraps a helix around the figure they describe. Both helices (and any subsequent ones) may be governed by the same independent variable, t. The variable t may be unitless from a mathematical perspective, and the point in time $t=0$ may be arbitrarily defined, so both the units for t and origin point $t=0$ may be chosen in advance. For instance, if t is described in units of days and $t=0$ corresponds with Jan. 1, 2015 at 12:00 am, then noon on April 8th may correspond to t=97.5. Selected times may be recorded, and easily displayed on a nested helix by plugging in the appropriate t into the equations. The generating process starts by considering a point moving around a circle in the XY plane. To generate a basic helix, a controller programmatically moves the circle up over time, tracking the path the point takes. To move the point to generate a helix around another, nested path, two steps may be taken. In the first step, the plane of the circle may be rotated so that it is perpendicular to the direction of travel of the nested path at any given time t (e.g., via derivatives, where the direction of travel at the point (x(t), y(t), z(t)) is (dx/dt, dy/dt, dz/dt). Variations may occur based on how the rotation is performed, and the below matrices are applied to rotate around the x-axis first and then the z-axis.

In the second step, the circle is translated so that its center is on the nested path. The point will now trace out the helix. Each subsequent helix will add two additional variables: a radius for the circle and a frequency parameter, $\omega$. The ratio between subsequent frequency parameters determines how many loops a new child helix makes per one loop of the parent. This means that if a day loop has frequency $\omega_d$, an hour loop may have a frequency $\omega_h$, =24 $\omega_d$. Adjusting the frequency parameters also adjusts the units of t.

The following equations and code may be used, for example, in Wolfram Mathematica software to generate a nested helical pattern.

TABLE 1

Code for Generating Nested Helical Pattern

```
x1[r1_,w1_,t_:]=r1*Cos[w1*t]
y1[r1_,w1_,t_:]=r1*Sin[w1*t]
z1[r1_,c1_,t_]:=c1*t
norm1[r1_,w1_,t_,c1_]=Sqrt[D[x1[r1,w1,t],t]^2+D[y1[r1,w1,t],t]^2+D[z1[r1,c1,t],t]^2];
dx1[r1_,w1_,t_,c1_]=D[x1[r1,w1,t],t]/norm1[r1,w1,t,c1];
dy1[r1_,w1_,t_,c1_]=D[y1[r1,w1,t],t]/norm1[r1,w1,t,c1];
dz1[r1_,w1_,t_,c1_]=D[z1[r1,c1,t],t]/norm1[r1,w1,t,c1];
dxy1[r1_,w1_,t_,c1_]= Sqrt[dx1[r1,w1,t,c1]^2+dy1[r1,w1,t,c1]^2];
(x2[r2_,w2_,r1_,w1_,c1_,t_]
y2[r2_,w2_,r1_,w1_,c1_,t_]
z2[r2_,w2_,r1_,w1_,c1_,t_]
)=Simplify[(x1[r1,w1,t]
y1[r1,w1,t]
z1[r1,c1,t]
)+(dy1[r1,w1,t,c1]/dxy1[r1,w1,t,c1]           dx1[r1,w1,t,c1]/dxy1[r1,w1,t,c1] 0
-dx1[r1,w1,t,c1]/dxy1[r1,w1,t,c1] dy1[r1,w1,t,c1]/dxy1[r1,w1,t,c1] 0
0           0           1
).(1           0           0
0           dz1[r1,w1,t,c1] dxy1[r1,w1,t,c1]
0           -dxy1[r1,w1,t,c1]           dz1[r1,w1,t,c1]
).(r2*Cos[w2*t]
r2*Sin[w2*t]
0
)];
(x2[r2,w2,r1,w1,c1,t]
y2[r2,w2,r1,w1,c1,t]
z2[r2,w2,r1,w1,c1,t]
)
{{(r1 ((c1^2+r1^2 w1^2) Cos[t w1] (Sqrt[(r1^2 w1^2)/(c1^2+r1^2 w1^2)] Sqrt[c1^2+r1^2 w1^2]+r2 w1 Cos[t w2])-c1 r2 w1 Sqrt[c1^2+r1^2 w1^2] Sin[t w1] Sin[t w2]))/(Sqrt[(r1^2 w1^2)/(c1^2+r1^2 Fw1^2)] (c1^2+r1^2 w1^2)^(3/2))},{(r1 ((c1^2+r1^2 w1^2) (Sqrt[(r1^2 w1^2)/(c1^2+r1^2 w1^2)] Sqrt[c1^2+r1^2 w1^2]+r2 w1 Cos[t w2]) Sin[t w1]+c1 r2 w1 Sqrt[c1^2+r1^2 w1^2] Cos[t w1] Sin[t w2]))/(Sqrt[(r1^2 w1^2)/(c1^2+r1^2 w1^2)] (c1^2+r1^2 w1^2)^(3/2))},{c1 t-r2 Sqrt[(r1^2 w1^2)/(c1^2+r1^2 w1^2)] Sin[t w2]}}
norm2[r2_,w2_,r1_,w1_,t_,c1_]=\[Sqrt](D[x2[r2,w2,r1,w1,c1,t],t]^2+D[y2[r2,w2,r1,w1,c1,t],t]^2+D[z2[r2,w2,r1,w1,c1,t],t]^2);
dx2[r2_,w2_,r1_,w1_,t_,c1_]=D[x2[r2,w2,r1,w1,c1,t],t]/norm2[r2,w2,r1,w1,t,c1];
dy2[r2_,w2_,r1_,w1_,t_,c1_]=D[y2[r2,w2,r1,w1,c1,t],t]/norm2[r2,w2,r1,w1,t,c1];
dz2[r2_,w2_,r1_,w1_,t_,c1_]=D[z2[r2,w2,r1,w1,c1,t],t]/norm2[r2,w2,r1,w1,t,c1];
dxy2[r2_,w2_,r1_,w1_,t_,c1_]= \[Sqrt](dx2[r2,w2,r1,w1,t,c1]^2+dy2[r2,w2,r1,w1,t,c1]^2);
(x3[r3_,w3_,r2_,w2_,r1_,w1_,c1_,t_]
y3[r3_,w3_,r2_,w2_,r1_,w1_,c1_,t_]
z3[r3_,w3_,r2_,w2_,r1_,w1_,c1_,t_]
)=(x2[r2,w2,r1,w1,c1,t]
y2[r2,w2,r1,w1,c1,t]
z2[r2,w2,r1,w1,c1,t]
)+(dy2[r2,w2,r1,w1,t,c1]/dxy2[r2,w2,r1,w1,t,c1]           dx2[r2,w2,r1,w1,t,c1]/dxy2[r2,w2,r1,w1,t,c1]
0
-dx2[r2,w2,r1,w1,t,c1]/dxy2[r2,w2,r1,w1,t,c1]           dy2[r2,w2,r1,w1,t,c1]/dxy2[r2,w2,r1,w1,t,c1]
0
0           0           1
).(1           0           0
0           dz2[r2,w2,r1,w1,t,c1]           dxy2[r2,w2,r1,w1,t,c1]
0           -dxy2[r2,w2,r1,w1,t,c1]           dz2[r2,w2,r1,w1,t,c1]
).(r3*Cos[w3*t]
r3*Sin[w3*t]
0
);
norm3[r3_,w3_,r2_,w2_,r1_,w1_,t_,c1_]=\[Sqrt](D[x3[r3,w3,r2,w2,r1,w1,c1,t],t]^2+D[y3[r3,w3,r2,w2,r1,w1,c1,t],t]^2+D[z3[r3,w3,r2,w2,r1,w1,c1,t],t]^2);
```

TABLE 1-continued

Code for Generating Nested Helical Pattern

```
dx3[r3__,w3__,r2__,w2__,r1__,w1__,t__,c1__]=D[x3[r3,w3,r2,w2,r1,w1,c1,t],t]/norm3[r3,w3,r2,w2,r1,w1
,t,c1];
dy3[r3__,w3__,r2__,w2__,r1__,w1__,t__,c1__]=D[y3[r3,w3,r2,w2,r1,w1,c1,t],t]/norm3[r3,w3,r2,w2,r1,w1
,t,c1];
dz3[r3__,w3__,r2__,w2__,r1__,w1__,t__,c1__]=D[z3[r3,w3,r2,w2,r1,w1,c1,t],t]/norm3[r3,w3,r2,w2,r1,w1
,t,c1];
dxy3[r3__,w3__,r2__,w2__,r1__,w1__,t__,c1__]=
\[Sqrt](dx3[r3,w3,r2,w2,r1,w1,t,c1]^2+dy3[r3,w3,r2,w2,r1,w1,t,c1]^2);
(x4[r4__,w4__,r3__,w3__,r2__,w2__,r1__,w1__,c1__,t__]
y4[r4__,w4__,r3__,w3__,r2__,w2__,r1__,w1__,c1__,t__]
z4[r4__,w4__,r3__,w3__,r2__,w2__,r1__,w1__,c1__,t__]
)=(x3[r3,w3,r2,w2,r1,w1,c1,t]
y3[r3,w3,r2,w2,r1,w1,c1,t]
z3[r3,w3,r2,w2,r1,w1,c1,t]
)+(dy3[r3,w3,r2,w2,r1,w1,t,c1]/dxy3[r3,w3,r2,w2,r1,w1,t,c1]
        dx3[r3,w3,r2,w2,r1,w1,t,c1]/dxy3[r3,w3,r2,w2,r1,w1,t,c1] 0
-dx3[r3,w3,r2,w2,r1,w1,t,c1]/dxy3[r3,w3,r2,w2,r1,w1,t,c1]
        dy3[r3,w3,r2,w2,r1,w1,t,c1]/dxy3[r3,w3,r2,w2,r1,w1,t,c1] 0
0       0       1
).(1    0       0
0       dz3[r3,w3,r2,w2,r1,w1,t,c1]          dxy3[r3,w3,r2,w2,r1,w1,t,c1]
0       -dxy3[r3,w3,r2,w2,r1,w1,t,c1]        dz3[r3,w3,r2,w2,r1,w1,t,c1]
).(r4*Cos[w4*t]
r4*Sin[w4*t]
0
);
norm4[r4__,w4__,r3__,w3__,r2__,w2__,r1__,w1__,t__,c1__]=\[Sqrt](D[x4[r4,w4,r3,w3,r2,w2,r1,w1,c1,t],t]^
2+D[y4[r4,w4,r3,w3,r2,w2,r1,w1,c1,t],t]^2+D[z4[r4,w4,r3,w3,r2,w2,r1,w1,c1,t],t]^2);
dx4[r4__,w4__,r3__,w3__,r2__,w2__,r1__,w1__,t__,c1__]=D[x4[r4,w4,r3,w3,r2,w2,r1,w1,c1,t],t]/norm4[r4,
w4,r3,w3,r2,w2,r1,w1,t,c1];
dy4[r4__,w4__,r3__,w3__,r2__,w2__,r1__,w1__,t__,c1__]=D[y4[r4,w4,r3,w3,r2,w2,r1,w1,c1,t],t]/norm4[r4,
w4,r3,w3,r2,w2,r1,w1,t,c1];
dz4[r4__,w4__,r3__,w3__,r2__,w2__,r1__,w1__,t__,c1__]=D[z4[r4,w4,r3,w3,r2,w2,r1,w1,c1,t],t]/norm4[r4,
w4,r3,w3,r2,w2,r1,w1,t,c1];
dxy4[r4__,w4__,r3__,w3__,r2__,w2__,r1__,w1__,t__,c1__]=
\[Sqrt](dx4[r4,w4,r3,w3,r2,w2,r1,w1,t,c1]^2+dy4[r4,w4,r3,w3,r2,w2,r1,w1,t,c1]^2);
(x5[r5__,w5__,r4__,w4__,r3__,w3__,r2__,w2__,r1__,w1__,c1__,t__]
y5[r5__,w5__,r4__,w4__,r3__,w3__,r2__,w2__,r1__,w1__,c1__,t__]
z5[r5__,w5__,r4__,w4__,r3__,w3__,r2__,w2__,r1__,w1__,c1__,t__]
)=(x4[r4,w4,r3,w3,r2,w2,r1,w1,c1,t]
y4[r4,w4,r3,w3,r2,w2,r1,w1,c1,t]
z4[r4,w4,r3,w3,r2,w2,r1,w1,c1,t]
)+(dy4[r4,w4,r3,w3,r2,w2,r1,w1,t,c1]/dxy4[r4,w4,r3,w3,r2,w2,r1,w1,t,c1]
        dx4[r4,w4,r3,w3,r2,w2,r1,w1,t,c1]/dxy4[r4,w4,r3,w3,r2,w2,r1,w1,t,c1]     0
-dx4[r4,w4,r3,w3,r2,w2,r1,w1,t,c1]/dxy4[r4,w4,r3,w3,r2,w2,r1,w1,t,c1]
        dy4[r4,w4,r3,w3,r2,w2,r1,w1,t,c1]/dxy4[r4,w4,r3,w3,r2,w2,r1,w1,t,c1]     0
0       0       1
).(1    0       0
0       dz4[r4,w4,r3,w3,r2,w2,r1,w1,t,c1]    dxy4[r4,w4,r3,w3,r2,w2,r1,w1,t,c1]
0       -dxy4[r4,w4,r3,w3,r2,w2,r1,w1,t,c1]  dz4[r4,w4,r3,w3,r2,w2,r1,w1,t,c1]
).(r5*Cos[w5*t]
r5*Sin[w5*t]
0
);
ParametricPlot3D[{{x1[10,2 Pi, t],y1[10,2 Pi, t],z1[10, 10, t]},{x2[1,730 Pi, 10,2 Pi, 10, t],y2[1,730 Pi,
10,2 Pi, 10, t],z2[1,730 Pi, 10,2 Pi, 10, t]},{x3[.2,24*730 Pi,1,730 Pi, 10,2 Pi, 10, t],y3[.2,24*730
Pi,1,730 Pi, 10,2 Pi, 10, t],z3[.2,24*730 Pi,1,730 Pi, 10,2 Pi, 10, t]}},{t,0,1},PlotStyle-
>{{Blue,Thick},Red,Green},PerformanceGoal->"Quality",PlotPoints->500]
```

Recommendations and Dynamic Rescheduling

Figure 12:
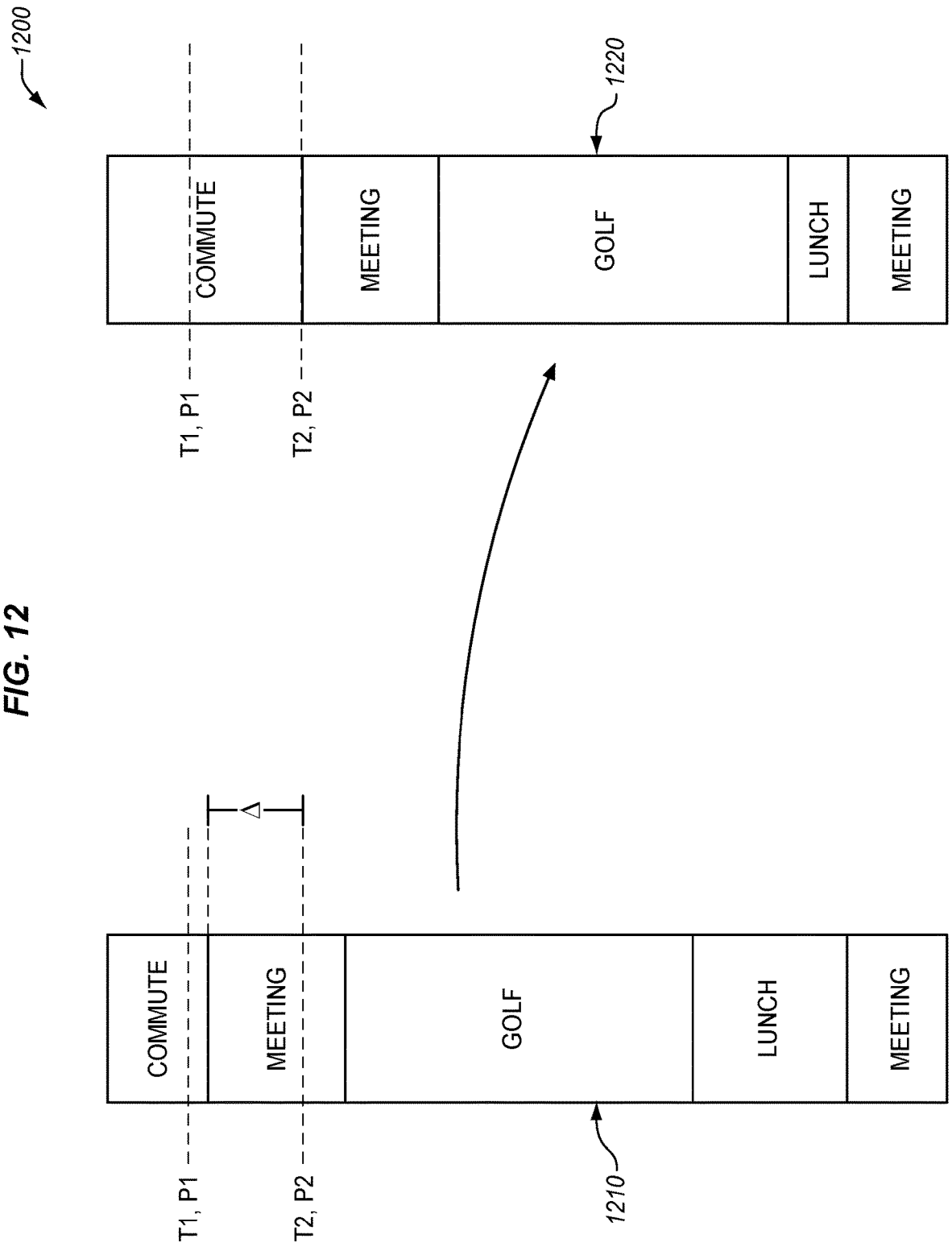
FIG. 12 is a diagram illustrating an exemplary rescheduling of events based on a location of a user.

FIGS. 12-15 illustrate exemplary operations performed by a recommendation system for dynamically analyzing and/or revising a user's schedule. FIG. 12 is a diagram 1200 illustrating an exemplary rescheduling of events based on a location of a user. According to FIG. 12, recommendation system 150 detects, based on a user's current location, a current time, and a location and time of an upcoming event, that the user will be unable to reach the upcoming event at the intended time. This may be performed, for example, by comparing estimated time of arrival (e.g., as calculated by an application like Google Maps), a mode of transport, and expected parking availability, against the expected time for the event, and determining an amount by which the user will be late A based on this information. Upon determining that the user will be late, recommendation controller 152 dynamically reschedules the upcoming event (in this case, a meeting) to move the meeting to a time and/or location that should be achievable for the user (e.g., based on criteria stored in memory 154, such as information indicating the anticipated amount of delay). Recommendation controller 152 further determines that moving the meeting to a later point in time will conflict with a later scheduled event, golf. However, based on information indicating that a priority of the meeting is higher than the priority of golf, recommendation controller 152 elects to reschedule golf as well instead of moving the meeting back to its original time, and notifies affected parties such as other players, the golf course, etc. This in turn causes a recursive "ripple effect" wherein the controller 152 automatically identifies the next event after golf, lunch, and dynamically resizes or reschedules the event to account for the change in time, resulting in a new schedule 1220 for the user. All of the above operations may be performed automatically with or without asking for permission from the user.

Figure 13:
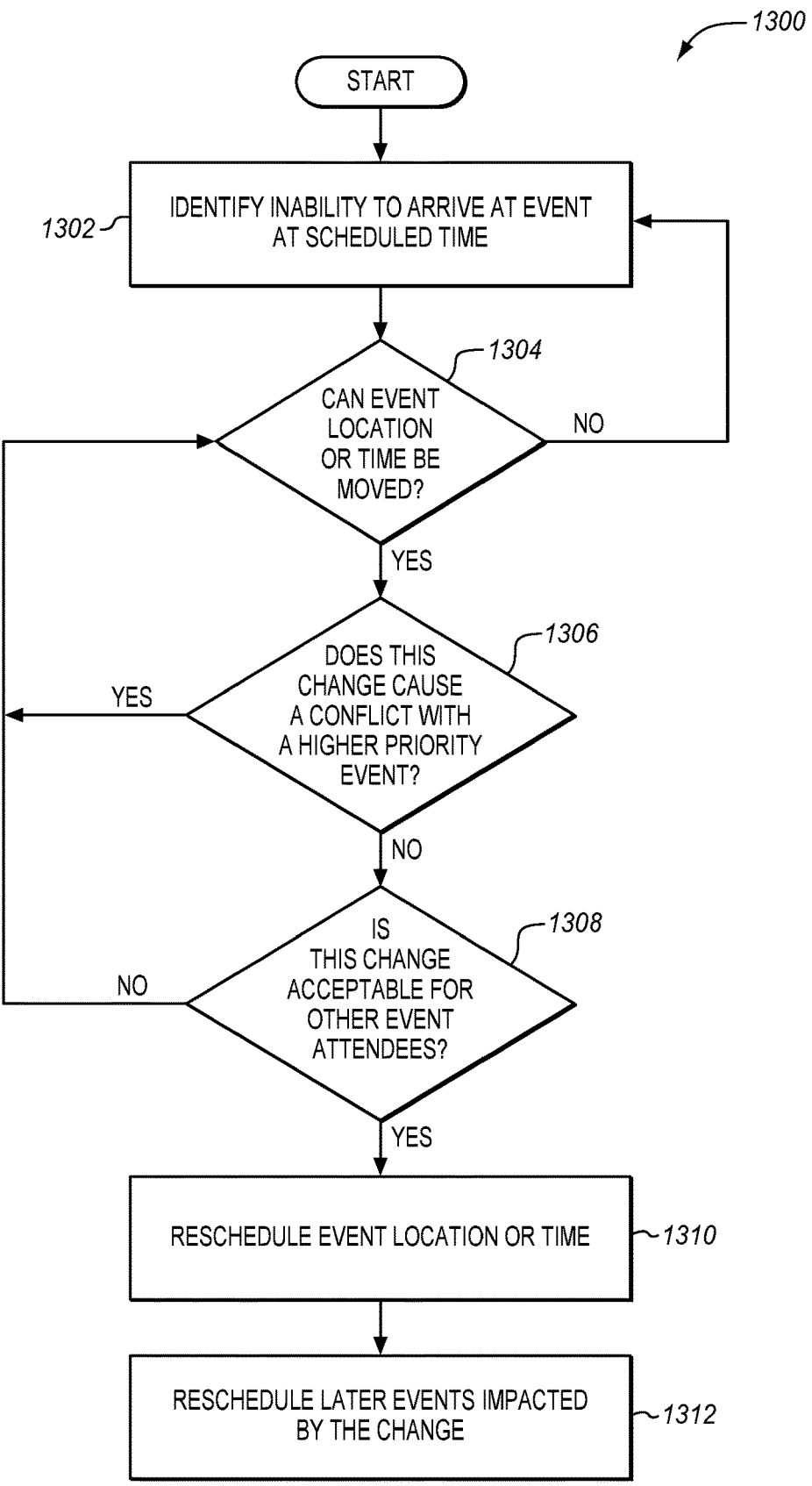
FIG. 13 is a flowchart illustrating an exemplary method for rescheduling events based on a location of a user.

FIG. 13 is a flowchart illustrating an exemplary method 1300 for rescheduling events based on a location of a user (e.g., as shown in FIG. 12). According to FIG. 13, in step 1302 recommendation controller 152 detects an inability of a user to arrive at an event at a scheduled time (or any other triggering condition causing recommendation controller 152 to identify an event for rescheduling). This may be determined based on a current location of the user compared against an expected location of the user at the time of the event, may be based on a notification from the user, or based on other suitable factors as desired. Based on this analysis, recommendation controller 152 determines that the present schedule of events for the user is no longer viable. Thus, recommendation controller 152 proceeds to step 1304 where it determines whether a location or time of the event can be moved in order to accommodate the user's present situation. For example, if the event can be moved to a location that is closer to a current or anticipated location of the user, or if the event can be moved to a later point in time that the user is anticipated to arrive, then there is the potential for rescheduling the event instead of canceling it. As a part of this step, recommendation controller 152 may further identify a variety of potential available new times and/or locations for the event.

If the event can be moved in step 1304, recommendation controller 152 determines where or not the changed location/time causes a conflict with a higher priority event in step 1306. If the change causes a conflict with a lower priority event, there is no issue because the lower priority event may be dynamically rescheduled via a recursive implementation of method 1300, and so on for other events displaced by the lower priority event. However, if there is a higher priority event that will be impacted by the changed location and/or time, then the original event should not be rescheduled to conflict with or otherwise impact the high priority event.

Priority itself may be defined along any number of dimensions. For example, priority may be determined based on user input, a type or category for the event, an amount of billing associated with the event, a project associated with the event, information describing people attending the event (e.g., based on a friendship level, attractiveness level, business income level, number of social network followers, etc.), and/or other factors as desired. Recommendation controller 152 may even recommend cancelling an activity if the activity has a priority level below a threshold amount, even if there are no other conflicting events. This allows recommendation controller 152 to weed out bad meetings or other events that result in a waste of time.

If the new location or time does not cause a conflict with a higher priority event, then in step 1308 recommendation controller 152 proceeds to determine whether the change is acceptable for other attendees of the event being moved. This step may be selectively performed depending on, for example, a priority level associated with each of the other event attendees. This step may comprise consulting other recommendation controllers (or other schedules of other users) in order to determine whether other attendees for the event are capable of adapting to this proposed change. If the changed location has been accepted by other users (e.g., other high-priority users) or is otherwise acceptable based on conflicts only existing with low-priority users then recommendation controller 152 reschedules the event location or time in step 1310, and in step 1312 recommendation controller 152 reschedules the conflicting later events that were impacted by the change via method 1300. Since the later events that were impacted by moving the original event are of a lower-priority (or the same level of priority) than the original event, recursively performing method 1300 resolves the schedule for high priority events, followed by lower-priority events. Recommendation controller 152 may further report the change in event time and location to the other users, via email, instant messaging, or any suitable communication channel.

In a further embodiment, recommendation controller 152 is operable to analyze schedules of other event attendees, and to identify a time in the future when all (or a threshold number of) meeting attendees are expected to be in a similar location. Similar techniques may be used to identify a time in the future when a specific venue is expected to be available for the attendees (e.g., by analyzing a schedule specifically maintained for the venue itself), or to identify a future point in time when a service provider (e.g., doctor) is expected to be available for meeting participants (such as a doctor). Recommendation controller 152 then attempts to reschedule the meeting to the identified time, via steps 1304-1312 of method 1300 described above.

Figure 14:
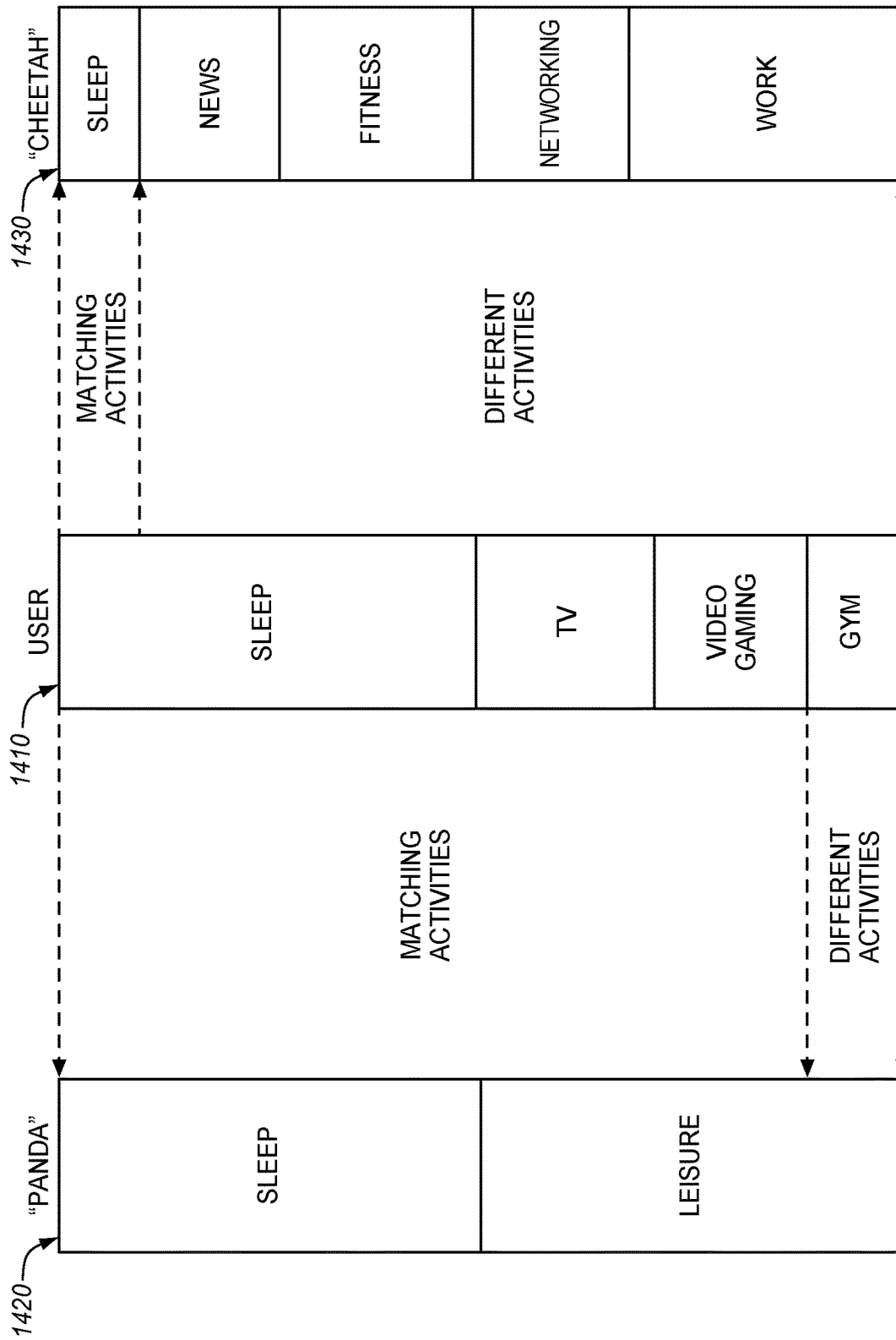
FIG. 14 is a diagram illustrating an exemplary set of behavioral patterns compared against a user's schedule.

FIG. 14 is a diagram 1400 illustrating an exemplary set of behavioral patterns compared against a user's schedule. According to FIG. 14, recommendation controller 152 stores behavioral patterns that each correspond with a different personality type. Each behavioral pattern may be stored as a set of times (e.g., days of the week, hours of the day) together with a category of events or activities associated with those times. For example, a "cheetah" behavioral pattern may include many socially or physically active events, while a "panda" behavioral pattern may include a large number of low-energy recreational and leisure activities. A behavioral pattern may also indicate ranges of time for the activities/categories of events that it describes, and these ranges may even overlap with each other in time. In such a case, a user's scheduled activity may match a behavioral pattern if it matches any of the categories of events (or specific events) listed for that time slot. Behavioral patterns may also represent the schedules of famous individuals such as athletes, actors, celebrities, fitness gurus, and others.

Recommendation controller 152 may compare a user's schedule of events to a stored behavioral pattern, for example, based on the names, categories, locations, and times of activities indicated in the user's schedule of events. Based on this information, recommendation controller 152 may classify the user into a personality type. For example, recommendation controller 152 may analyze schedule 1410 from a user, and detect large number of matches over a long period of time indicating a high correlation with behavioral pattern 1420 ("panda"), and may detect a small number of matches over a short period of time indicating a low correlation with behavioral pattern 1430 ("cheetah"). Thus, recommendation controller 152 may classify the user as having a "panda" personality type because of the higher correlation of the user's schedule with that behavioral pattern.

Based on this personality type, recommendation controller 152 may further identify changes to the user's schedule to optimally adjust to that personality type, or to transition to a new personality type. For example, in order to transition to a cheetah personality type, recommendation controller 152 may display a recommendation to the user to wake up earlier on a daily basis. For example, controller 152 (or the user) may ascribe a happiness or priority rating to each event on the user's schedule, and controller 152 may then identify events with the highest happiness or priority rating, and suggest replacing lower happiness/priority events with higher happiness/priority events. In a further embodiment, the user may define a set of goals in terms of changed activities, and controller 152 may identify periods of time for performing those activities based on the personality type of the user. For example, a user with the "panda" personality type may request more fitness activities in their schedule. Controller 152 may determine, based on the "panda" behavioral pattern, that highly active early morning events are incompatible with the user, and may therefore recommend replacing the user's evening schedule with visits to the gym, a long walk, or other fitness activities. Controller 152 may further shape the tone of recommendations based on a user's personality type/behavioral pattern. Thus, one behavioral pattern may be associated with kind suggestions, while another behavioral pattern may be associated with blunt or aggressive commands.

Figure 15:
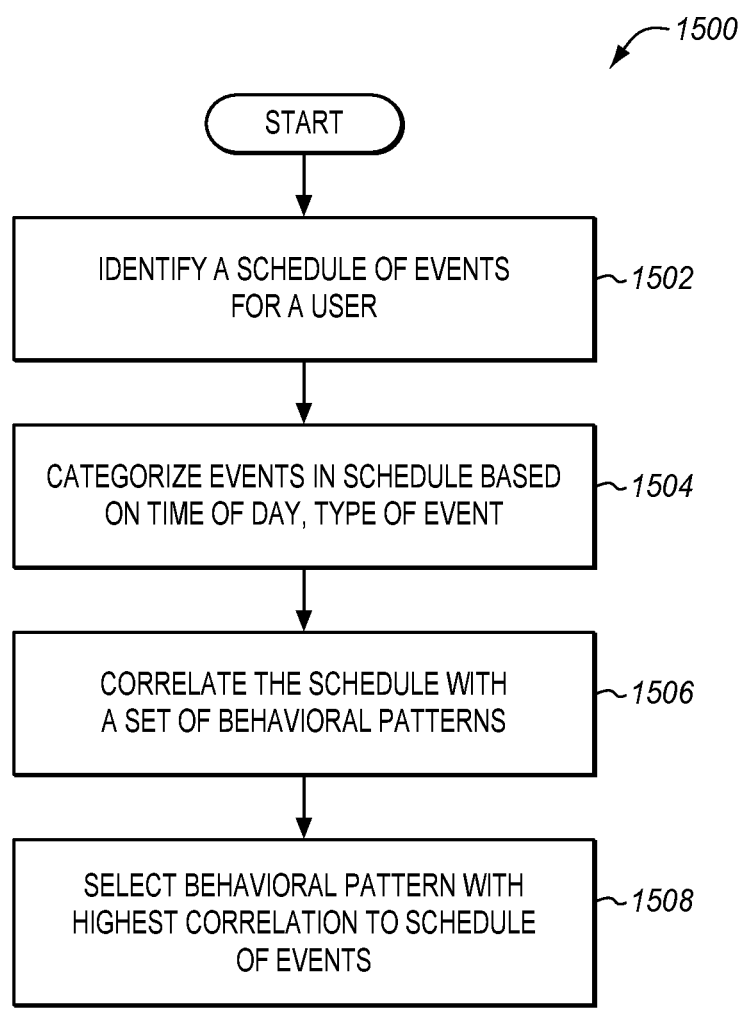
FIG. 15 is a flowchart illustrating an exemplary method for correlating a user's schedule with a behavioral pattern.

FIG. 15 is a flowchart 1500 illustrating an exemplary method for correlating a user's schedule with a behavioral pattern. According to FIG. 15, in step 1502 recommendation controller 152 identifies a schedule of events for a user from database 140. The schedule of events may represent any suitable period of time, such as a day, a month, etc., and may represent a schedule of future events or a schedule of events that have already happened. Recommendation controller 154 may further generate a generic schedule of a day, weekday, hour, month, etc., based on identified schedule, for example, by calculating and aggregating a percentage of each hour of each weekday taken up by sleeping, working, fitness, etc.

In step 1504, recommendation controller 152 categorizes the events in the schedule, based on their time of day and the type of event that is occurring. For example, recommendation controller 152 may assign each event to a category (e.g., based on information from a user classifying the events, or based on a list of events for each category), and then may calculate the category of activity in the schedule that occupies the highest percentage of the user's time for a given period of time such as an hour of the day. Thus, recommendation controller 152 may determine that the early weekday hours are generally spent sleeping, while the late hours of the night on weekdays are generally spent working.

In step 1506, recommendation controller 152 correlates the schedule with a set of behavioral patterns stored in memory 154. The behavioral patterns may indicate an ideal schedule, or a summarized version of such. For example, a behavioral pattern may indicate that ideally 9 am-10 am will be occupied by breakfast, or may indicate that 9 am-10 am should statistically be breakfast 80% of the time, reading the news 10% of the time, and commuting 10% of the time. A behavioral pattern also may correlate individual periods of time with categories of events instead of specific activities, making it easier to correlate the entire universe of potential human activity with a behavioral pattern.

Using this information from the behavioral patterns, recommendation controller 152 correlates the schedule with each of the behavioral patterns (e.g., by comparing the activities in the schedule for each hour, day, week to an idealized version indicated by each behavioral pattern), and assigns a score for each behavioral pattern. In one embodiment, the score is determined by identifying, for each hour, an average fraction of time spent by the user doing various activities. Each fraction is added to the score if it matches the behavioral pattern for that time. Thus, in the hour from 11 am to 12 pm, if a user visits the gym 80% of the time (e.g., four out of five days) and reads 20% of the time, and if the behavioral pattern indicates fitness and networking for that weekday hour, then the score for the user's fitness activities for that hour may be calculated as follows. For the gym, the score is 0.8 because it matches a listed category in the behavioral pattern. Meanwhile, reading provides a score of zero because it does not match a listed category for that weekday hour for that behavioral pattern. In step 1508, recommendation controller 152 selects the behavioral pattern with the highest correlation/score for the schedule of events, and sets the expected personality type of the user to that behavioral pattern.

In a further embodiment, controller 152 may provide a set of intake questions to each user in order to identify a personality type/behavioral pattern for that user. These questions may relate to common activities performed by the user, when the activities are performed by the user, general feelings or outlooks held by the user, etc. This information may be useful in identifying or further clarifying a behavioral pattern/personality type to associate with the user.

In a further embodiment, controller 152 may compare a user's scheduled activities for a day against the activities that were actually performed by the user during that day (e.g., as reported by GPS information, user input, email sources, etc.). Controller 152 may use the correlation techniques described above for behavioral patterns in order to determine whether discrepancies exist between scheduled and performed activities (e.g., for specific types of events, for events at certain times of day, for events occurring on certain days, etc.). Controller 152 may then generate recommendations or observations based on these determinations.

Recommendation System Examples

The following examples illustrate interactions of a recommendation/scheduling system with different exemplary users of the recommendation system. In these examples, the first exemplary user is named Joe. Joe is a mid-level commercial real estate broker that is looking to shift his business into real estate development. Joe downloads instructions for an application into his phone, turning the phone into a scheduling/recommendation system (i.e., the processor of the phone, in combination with the instructions stored in memory, operates as a recommendation engine and scheduling system. Thus, references to "the application" refer to the processor of the phone implementing instructions, and may refer to operations of the scheduling system, the recommendation system, and/or various components thereof.

On activating the application, the application walks Joe through a registration process, where Joe may provide credentials and contact information for retrieving data via various input channels including email accounts, calendars, wearable devices, etc. Joe also provides credentials for the application to remotely access his billing and accounting software. The application then tracks Joe via the input channels and provides him with reports in real time of how he spends his time and/or money. The application also shows Joe how his actual schedule differs from his planned schedule, by comparing input channels indicating actual activities (e.g., GPS location input) against input channels indicating scheduled activities (e.g., a calendar).

Next, the application compares Joe's schedule to an ideal behavioral pattern labeled "commercial real estate developer" that is maintained in memory. The ideal behavioral pattern is pulled from an Internet-accessible library of schedules maintained on a server accessible to the application. Through an ongoing comparative analysis, the application provides feedback and makes suggestions to Joe on how he may improve his schedule so that he will get closer to his goals.

The application is also associated with a website through which Joe may configure his account. In this example, Joe may create his account for the application by providing an email address and password on the website itself. These login credentials enable Joe to sign into the application and website. During the initial sign up process, Joe answers a questionnaire about why he is signing up for an account. The application (or website) provides Joe questions about how he likes to spend his time, how he defines success, how he would like to improve his success and in what time frame. The application also asks Joe to fill his calendar as accurately as possible for the next week. The application then uses an intelligent survey tool that responds with questions depending on how the previous question was answered (e.g., via a flowchart style logic structure). In this manner, the application learn as much as possible about Joe while requiring a minimal amount of time. Based on responses to the questions, the recommendation controller categorizes Joe into a user type, and defines success metrics for Joe.

Joe provides the application with credentials to his email account, his Fitbit tracker and his Gmail calendar. The application then creates two time maps for Joe. The first time map corresponds with his planned schedule, and the second time map corresponds with his actual schedule. The planned schedule is pulled from his existing calendar. The actual schedule of how Joe spends his time is determined by assembling information from email (e.g., what time emails are sent, the length of the emails, who the emails are sent to, and the content of the emails), calendars (e.g., the when, where, and who of scheduled events), GPS tracking of movements from his phone, text messages (e.g., who he sends messages to, what the contents of the messages are, and when they are sent), billing and accounting software (e.g., who Joe's clients are, how much each one of them has paid him over time, what Joe's billable hours are for each client), and other sources. GPS tracking information may be acquired by, for example, Joe enabling the application to utilize location tracking and services on the phone. The application may then use location information to correlate activities with certain locations. This may help to provide information indicating activities performed by Joe if there is no explicit event listed on the calendar. The application assembles the information from these sources into a database stored on Joe's phone and/or an Internet accessible server. The application also dynamically determines when new database entries were created with respect to the current time, and applies a name to each entry in the database. The application also assigns a layer to each activity, based on a name of the activity, time of the activity, and/or location of the activity.

Joe then goes about his daily routine. The application therefore causes no disruption to Joe's daily schedule other than occupying background processing resources of Joe's phone. Joe may occasionally receive push messages from the application with questions about his daily activities, physical energy levels, and emotional state. Based on these responses and contextual information (e.g., location), when the application detects unknown/unclassified periods of time in Joe's schedule, it determines a set of probable activities that Joe is engaged in, and by push notification, asks Joe directly to respond by confirming and/or selecting one of the probable activities. These push notifications may be multiple choice, fill in the blank, etc.

The application may then compile reports based on Joe's activities. For example, the application may generate a push notification for Joe after one week, providing a report about how his time is spent. The application generates the report as a helical infographic illustrating how Joe spent his time during the week. In this example, the helical structure is created by mapping data to a digitally generated 3D helix of time using cylindrical coordinates. Joe clicks through preset views provided by the application that allow him to view the 3D helix at varying levels of magnification. In this example, the application presents preset views showing Joe's behavioral patterns via hourly, daily, weekly, yearly and multi-year views.

Specific layers or sections of time are isolated and presented for viewing via the application in a fashion similar to an "exploded axonometric" view. The application enables Joe to create custom views of the 3D helix, by panning, zooming, changing the visibility of layers or elements of the map (e.g., on/off, solid, wireframe), etc. The application also enables Joe to view specific layers and/or sections of time as desired.

The 3D helix shows the difference between how Joe plans his time, and how he actually spends his time, by presenting these behavioral patterns on different layers. In its default setting, the application directs a display of Joe's phone to update the 3D helix in real time. Thus, the application actively pulls in data for current activities and infills the 3D helix in real time. The 3D helix may be presented to any suitable user that Joe grants access to, and may be presented via either the website or the mobile application.

The application also makes various recommendations to Joe based on his patterns of behavior, in the form of recommendation reports that are indicated via push notifications. For example, a recommendation report may be generated after a threshold period of time (e.g., one week, two weeks, one month) has passed, and may be provided directly via the application or via email in a Portable Document File (PDF) format. Each report may further indicate how future activities of the user are expected to occur if no adjustments are made, by extrapolating the user's short and mid-term habits over a longer time period, and mapping the extrapolated data onto the 3D helix. The report generated by the application may further indicate the behavioral pattern that the user's schedule is most highly correlated with.

After analyzing Joe's actual schedule, the application categorizes Joe in to a user type. The report then shows him how his user type differs from his ideal behavioral pattern, which Joe indicated in his initial registration process. The application also generates recommendations by comparing the data from Joe's schedule against his ideal/target behavioral pattern. The application then recommends how to eliminate the differences between Joe's actual and ideal schedules by suggesting that Joe spend different amounts of time on different activities in his schedule. The application may further recommend starting new activities and/or stopping certain activities entirely.

Joe grants the application permission to take over his schedule, and the application prepopulates Joe's calendar with events dedicated to activities that match with the target behavioral pattern. Included in the new calendar are activities for market research, new business development, exercise, and rest. The application then pushes the new calendar to Joe's email account. Upon logging in, Joe can revise the specific times and locations for each of the new activities. Joe may further adjust the new calendar as desired to deviate from the new schedule generated by the application.

The application supervises Joe's calendar entries and his actual activities, and continually pushes notifications to Joe in real time based on his current behavior and goals. For example, when Joe deviates from the planned events, the application provides positive recommendations asking him to consider changing his schedule to be more effective. These nudges are determined by the application assigning a priority value to Joe's activities and contacts. For example, a nudge may state "Why are you scheduling this meeting? You have no associated billable hours with this client," or may state "You should be spending more time after work exercising and taking recovery time because tomorrow is a big day." The application also identifies incoming meeting requests from the calendar or email account, and responds to the meeting requests with conditional responses based on rules defined by Joe. For example, the application may automatically accept or reject event invitations from specific users, based on the priority levels of those users.

A user Sarah may also utilize an application on her phone to implement a scheduling/recommendation system. In this example, Sarah is dental hygienist who has a four year old in preschool and is interested in becoming more grounded and living a balanced life. She has a regular 10 am to 4 pm schedule and is free on weekends. Sarah shares her calendar with her husband, and but is not heavily involved in technology.

During sign up, Sarah provides credentials for her email account. She also installs the application on her phone. The application then tracks Sarah and provides her with reports in real time indicating how she spends her time. Since Sarah doesn't use her electronic calendar systems regularly, the application regularly asks her, via emails and push notifications, how she has been spending her time. The application determines an amount of push messages to ask Sarah how she spent her time in a given period, based on how densely populated Sarah's digital calendar for her email account is for that period.

Sarah also sets up tiered levels of access for others to view various aspects of her schedule on her account. For example, Sarah grants her husband's user account full access to view and modify her schedule, but grants a babysitter only access to view the portions of her schedule that occur during weekday evenings. The application then shares Sarah's schedule with her husband so they can plan activities for their son.

The application also determines, based on Sarah's responses to an interactive questionnaire, that Sarah desires a more balanced schedule. The application instructs Sarah to fill out a calendar with information describing her activities, and then assembles two time maps for Sarah, corresponding to a target schedule and an actual schedule. In this example, the application uses metrics and guidelines established by life coaches and time management experts to generate an ideal/target schedule and formulate recommendations to Sarah for changing her schedule. Thus, through continuous comparative analysis, the application provides suggestions for Sarah and her husband indicating how she can live a more balanced life.

Sarah's actual schedule is determined by pulling information in a similar manner as described above for Joe, and storing the information in a database on Sarah's phone or on an Internet server for the application. The application then tracks Sarah's actual schedule and provides push messages in a similar manner as described for Joe. The application also provides infographics in a similar manner as described for Joe above. Furthermore, the application generates recommendation reports in a similar manner as described above for Joe, except that Sarah's actual schedule is compared against a behavioral pattern for a balanced lifestyle. Furthermore, in this example, the application dedicates blocks of Sarah's time to activities associated with the balanced lifestyle behavioral pattern. Thus, activities are scheduled for meditation, yoga, family time, and rest.

In a third example, Tyler utilizes a scheduling/recommendation system to manage one or more projects for work. Tyler is a project manager at a demolition firm. He is responsible for setting the schedule for five of his employees. In this example, Tyler utilizes the application to organize multiple demolition projects, by generating a shared project in the application for each demolition project, and providing permissions to his employees to view and edit scheduled events for those scheduled projects. Each shared project may be stored on Tyler's phone, his computer, or via a shared network server. The shared project may also include each employee's schedule as a layer, and free time may be quickly identified by viewing the layers together at once on a single 3D helix.

To initially generate a shared project, Tyler answers a questionnaire provided by an instance of the application, and selects a project model that he wants to follow for the demolition of a defunct reservoir dam. He also sets a projected completion time. Information Technology (IT) support personnel provide Tyler's application with login credentials for each team member's email account and calendar. Then, the application creates two time maps for the shared project, which correspond to a planned project schedule and an actual project schedule. The planned schedule is pulled from the scheduled project calendar, while the "actual" schedule of how Tyler's team spends their time is determined by assembling information from the same sources as discussed above for Joe and Sarah. Further data may be provided via project management software (e.g., what the time line for the project is, whether the project is on schedule, delays, costs, additional fees, who is involved, etc.) and integrated into a centralized or distributed database.

The shared project schedule may be populated and Tyler's team members may be tracked in a similar manner to that described for Joe above. In this embodiment, each application may generate unique questions for each of Tyler's team members to identify the activities being currently performed by each team member. In this example, the application further supports team reminders and scheduled updates sent between team members, as well as an input system where team members can "check off" tasks as complete and the application populates this information to the project calendar.

In this example, Tyler establishes milestones and completion dates for each shared project, and provides his application access credential for tracking his employees' locations and/or emails. The application then tracks the phones of the team members and analyzes each team member's personal calendar. The application compares the activities of the team as a whole against a predefined ideal schedule of activities (e.g., as populated by Tyler or as generated based on ideal team dynamics). The application further provides reports and recommendations to Tyler indicating how to hit deliverable dates, by identifying one or more activities that are required for a project milestone but that have not occurred yet, and recommending immediate implementation of those activities. The application may further detect changes and delays to the schedule based on information in emails between team members and based on individual schedules. These updates may then be distributed via an Internet server to each user's application on their own phone.

The application makes an ongoing analysis of the team's progress, and transmits reports to a selected group of users (e.g., Tyler, his superiors, etc.) indicating discrepancies from the schedule. The application may further generate an individualized set of recommendation reports for the users of the project, and may present each user's calendar as a 3D helix, as well as present each user's calendar as a layer of a shared 3D helix representing the project schedule. Representation and updating of the 3D helix may be performed in a similar manner as described above for Joe. Recommendation reports may be provided by the application via email, and the application may enable Tyler to annotate recommendation reports before forwarding the reports to his team by enabling them to view the reports in their own applications. The recommendation reports may include content similar to that described for Joe, and be updated in a similar manner as described for Joe above.

The application may then populate Tyler's team's calendars with blocked out appointment blocks dedicated to certain activities in keeping with the ideal schedule. The activities include meeting times for other projects, team meetings, and rest. Thus, each team member may log into their own instance of the application to identify their new tasks, and relocate or modify these tasks as needed. Furthermore, each team member may receive unique recommendations based on their own calendars (and comparison of ideal versus actual calendars).

The application further generates weekly updates and transmits them to Tyler to indicate the team's current progress compared against the ideal project schedule up to completion. Furthermore, after the project is over Tyler the application generates a complete report assessing the actual project schedule as compared with the ideal schedule. At the end of the project, an analysis is sent to the selected group of users with recommendations on how to make improvements. For example, the application may detect that one user has been consistently off-schedule, and suggest that the user be trained or reprimanded.

In this example, in addition to phone-based applications, each project member uses a desktop instance of the application as well. The various applications coordinate their activities and schedules via a central server. Also, in this example, each user is associated with an access level. Therefore, Tyler is granted full access to view and modify all schedules for the project, while team members may be granted more limited permissions by Tyler as desired.

Figure 16:
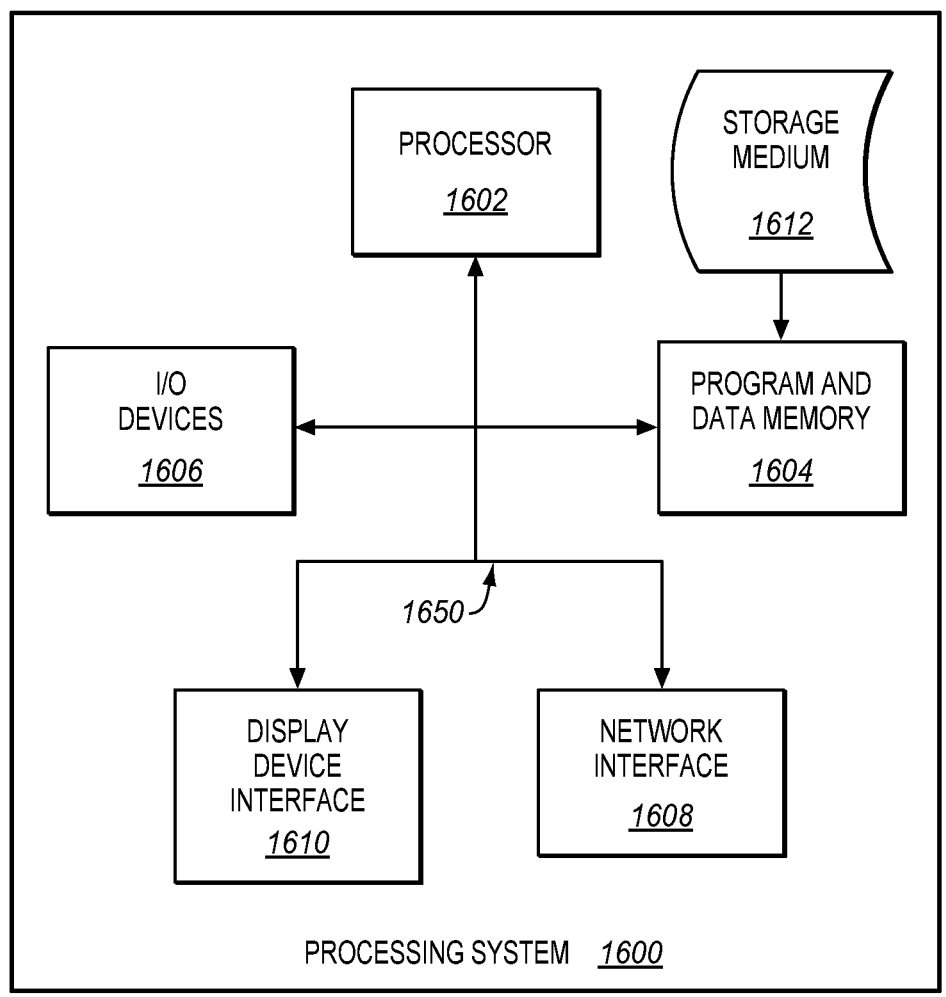
FIG. 16 illustrates an exemplary processing system operable to execute programmed instructions embodied on a computer readable medium.

Embodiments disclosed herein can take the form of software, hardware, firmware, or various combinations thereof. In one particular embodiment, software is used to direct a processing system of scheduling system 110 and/or recommendation system 150 to perform the various operations disclosed herein. FIG. 16 illustrates an exemplary processing system 1600 operable to execute a computer readable medium embodying programmed instructions. Processing system 1600 is operable to perform the above operations by executing programmed instructions tangibly embodied on computer readable storage medium 1612. In this regard, embodiments of the invention can take the form of a computer program accessible via computer readable medium 1612 providing program code for use by a computer (e.g., processing system 1600) or any other instruction execution system. For the purposes of this description, computer readable storage medium 1612 can be anything that can contain or store the program for use by the computer (e.g., processing system 1600).

Computer readable storage medium 1612 can be an electronic, magnetic, optical, electromagnetic, infrared, or semiconductor device. Examples of computer readable storage medium 1612 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 1600, being used for storing and/or executing the program code, includes at least one processor 1602 coupled to program and data memory 1604 through a system bus 1650. Program and data memory 1604 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 1606 (including but not limited to keyboards, displays, pointing devices, etc.) can be coupled either directly or through intervening I/O controllers. Network adapter interfaces 1608 can also be integrated with the system to enable processing system 1600 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 1610 can be integrated with the system to interface to one or more display devices, such as printing systems and screens for presentation of data generated by processor 1602.

What is claimed is:

1. A system comprising:
an interface; and
a controller operable to identify a schedule comprising multiple events occurring over a length of time, to select a cyclic period within the length of time, to generate a representation of the length of time as a view of a three dimensional (3D) helix wherein each revolution of the 3D helix corresponds with an iteration of the cyclic period, and to determine a location for each of the events along a path defined by the 3D helix,
wherein the controller is further operable to direct the interface to transmit instructions for presenting the 3D helix and the event locations via a display, and to visually unfurl the 3D helix to linearize the events onto a timeline for presentation via the display, by presenting at least one transitional depiction in which the 3D helix is partially unfurled.

2. The system of claim 1, wherein:
the controller is further operable to unfurl the 3D helix by transitioning the 3D helix from a helical shape to an intermediary shape, and from the intermediary shape to a linear shape.

3. The system of claim 1, wherein:
the controller is further operable to unfurl a portion of the 3D helix corresponding with a selected length of time.

4. The system of claim 3, wherein:
the controller is further operable to arrange events that occur over the selected length of time onto the timeline for viewing.

5. The system of claim 1, wherein:
the controller is further operable to re-arrange events that have been linearized onto the timeline.

6. The system of claim 1, wherein:
the events are assigned to categories, and the controller is further operable to group events in the same categories together on the timeline for viewing.

7. The system of claim 1, wherein:
the controller is further operable to unfurl a portion of the 3D helix selected by a user.

8. A non-transitory computer readable medium embodying programmed instructions which, when executed by a processor, are operable for directing the processor to perform a method comprising:
identifying a schedule comprising multiple events occurring over a length of time;
identifying a cyclic period within the length of time;
generating a representation of the length of time as a view of a three dimensional (3D) helix wherein each revolution of the 3D helix corresponds with an iteration of the cyclic period;
determining a location for each of the events along a path defined by the 3D helix;
presenting the 3D helix and the event locations for display; and
visually unfurling the 3D helix to linearize the events onto a timeline for presentation via the display, by presenting at least one transitional depiction in which the 3D helix is partially unfurled.

9. The medium of claim 8, wherein:
unfurling the 3D helix comprises transitioning the 3D helix from a helical shape to an intermediary shape, and from the intermediary shape to a linear shape.

10. The medium of claim 8, wherein:
unfurling the 3D helix comprises unfurling a portion of the 3D helix corresponding with a selected length of time.

11. The medium of claim 10, wherein the method further comprises:
arranging events that occur over the selected length of time onto the timeline for viewing.

12. The medium of claim 8, wherein the method further comprises:
re-arranging events that have been linearized onto the timeline.

13. The medium of claim 8, wherein:
the events are assigned to categories, and the method further comprises grouping events in the same categories together on the timeline for viewing.

14. The medium of claim 8, further comprising:
unfurling a portion of the 3D helix selected by a user.

15. A method comprising:
identifying a schedule comprising multiple events occurring over a length of time;
identifying a cyclic period within the length of time;
generating a representation of the length of time as a view of a three dimensional (3D) helix wherein each revolution of the 3D helix corresponds with an iteration of the cyclic period;
determining a location for each of the events along a path defined by the 3D helix;
presenting the 3D helix and the event locations for display; and
visually unfurling the 3D helix to linearize the events onto a timeline for presentation via the display, by presenting at least one transitional depiction in which the 3D helix is partially unfurled.

16. The method of claim 15, wherein:
unfurling the 3D helix comprises transitioning the 3D helix from a helical shape to an intermediary shape, and from the intermediary shape to a linear shape.

17. The method of claim 15, wherein:
unfurling the 3D helix comprises unfurling a portion of the 3D helix corresponding with a selected length of time.

18. The method of claim 17, further comprising:
arranging events that occur over the selected length of time onto the timeline for viewing.

19. The method of claim 15, further comprising:
re-arranging events that have been linearized onto the timeline.

20. The method of claim 15, wherein:
the events are assigned to categories, and the method further comprises grouping events in the same categories together on the timeline for viewing.

* * * * *